United States Patent [19]
Judell

[11] Patent Number: 5,572,448
[45] Date of Patent: Nov. 5, 1996

[54] ENHANCED RESOLUTION IMAGING AND MEASUREMENT SYSTEMS

[75] Inventor: Neil H. Judell, Andover, Mass.

[73] Assignee: Technology Development Group, Inc.

[21] Appl. No.: 154,363

[22] Filed: Nov. 18, 1993

Related U.S. Application Data

[63] Continuation-in-part of Ser. No. 977,684, Nov. 18, 1992, Pat. No. 5,420,803.

[51] Int. Cl.⁶ ................................................. G01B 15/00
[52] U.S. Cl. ............... 364/563; 364/413.13; 364/413.14; 364/413.25; 128/660.01; 128/653.1
[58] Field of Search .................. 364/422, 413.13, 364/413.14, 413.25, 413.22, 561, 563; 128/660.01, 660.07, 660.08, 653.1, 653.2, 653.4, 653.3, 734; 250/363.01–363.05, 370.08; 73/602, 601, 607; 378/414, 62, 63, 901; 324/307, 309, 318, 662, 671; 382/6, 8

[56] References Cited

U.S. PATENT DOCUMENTS

| | | | |
|---|---|---|---|
| 4,701,706 | 10/1987 | Haacke | 324/309 |
| 4,748,410 | 5/1988 | Macovski | 324/309 |
| 4,849,916 | 7/1989 | Abbe et al. | 364/563 |
| 4,947,323 | 8/1990 | Smith | 364/413.13 |
| 5,229,933 | 7/1993 | Larson, III | 364/413.25 |
| 5,283,837 | 2/1994 | Wood | 364/413.14 |
| 5,284,142 | 2/1994 | Goble et al. | 364/413.13 |
| 5,291,402 | 3/1994 | Pfoh | 364/413.14 |
| 5,324,946 | 6/1994 | Ichihara et al. | 250/363.04 |

Primary Examiner—James P. Trammell
Assistant Examiner—Hal D. Wachsman
Attorney, Agent, or Firm—Fish & Richardson, P.C.

[57] ABSTRACT

A computed axial tomography (CAT) system including a ring assembly surrounding a location at which the object is placed; an X-ray source mounted on the ring assembly; an array of X-ray sensors arranged on the periphery of the ring assembly for measuring X-ray intensity from the object; a drive motor for rotating the ring assembly about the object; measurement control circuitry controlling the drive motor, receiving data from the array of X-ray sensors and generating a plurality of vectors of X-ray data therefrom, said plurality of vectors being represented by a measured column tensor; a memory for storing the measured column tensor; and a computer programmed to left multiply the measured column tensor stored in said memory by a reconstruction tensor T to obtain an estimate of a desired measurement column tensor, wherein said reconstruction tensor T is equal to $R_{dm}R_{mm}^{-1}$, $R_{dm}$ being a cross-covariance tensor computed for d, a desired measurement column tensor, and m, the measured column tensor, and $R_{mm}$ being an auto-covariance tensor computed for m, the measured column tensor, and wherein the estimate of a desired measurement column tensor represents an estimate of measurements that would be obtained from an hypothetical array of X-ray sensors having a higher resolution than said first mentioned array of X-ray sensors.

25 Claims, 14 Drawing Sheets

```
for (i=0;i<NumberOfRings;i++)
{
    for (j=0;j<NumberOfRings;j++)
    {
        for (theta=0;theta<NumberOfAngles;theta++)
        {
   240 ─── rmm[theta] = Expected value of measured data at ring number i,
                       angle value of 0 times measured data at ring number j, angle value
                       of theta;
   242 ─── rdm[theta] = Expected value of desired data at ring number i, angle
                       value of 0 times measured data at ring number j, angle value of
                       theta;
        }
   244 ─── smm = FFT(rmm);
   246 ─── sdm = FFT(rdm);
   248 ─── Rmm[theta][i][j] = smm[theta];
   250 ─── Rdm[theta][i][j] = sdm[theta];
    }
}
for (theta=0;theta<NumberOfAngles;theta++)
{
    for (j=0;j<NumberOfRings;j++)
    {
   252 ─── T1[i][j] = Rdm[theta][i][j];
   254 ─── T2[i][j] = Rmm[theta][i][j];
    }
}
```

FIG. 3A

```
256 ⌐  T3 = MatrixInverse(T2);
       ReconstructorMatrix[theta] = MatrixProduct(T1,T3);
     }
```

FIG. 3B

```
for (i=0;i<NumberOfRings;i++)
{
    TransformedDataRing[i] = FFT(InputDataRing[i]);
260 ⌐
} for (theta=0;theta<NumberOfAngles;theta++)
{
    for (i=0;i<NumberOfRings;i++)
    {
262 ⌐   TempVector1[i] = TransformedDataRing[i][theta];
    }
264 ⌐ TempVector2 = MatrixVectorProduct(ReconstructorMatrix[theta], TempVector1);
    for (i=0;i<NumberOfRings;i++)
    {
266 ⌐   TransformedDataRing[i][theta] = TempVector2[i];
    }
} for (i=0;i<NumberOfRings;i++)
{
268 ⌐  OutputDataRing[i] = InverseFFT(TransformedDataRing[i]);
}
```

FIG. 6

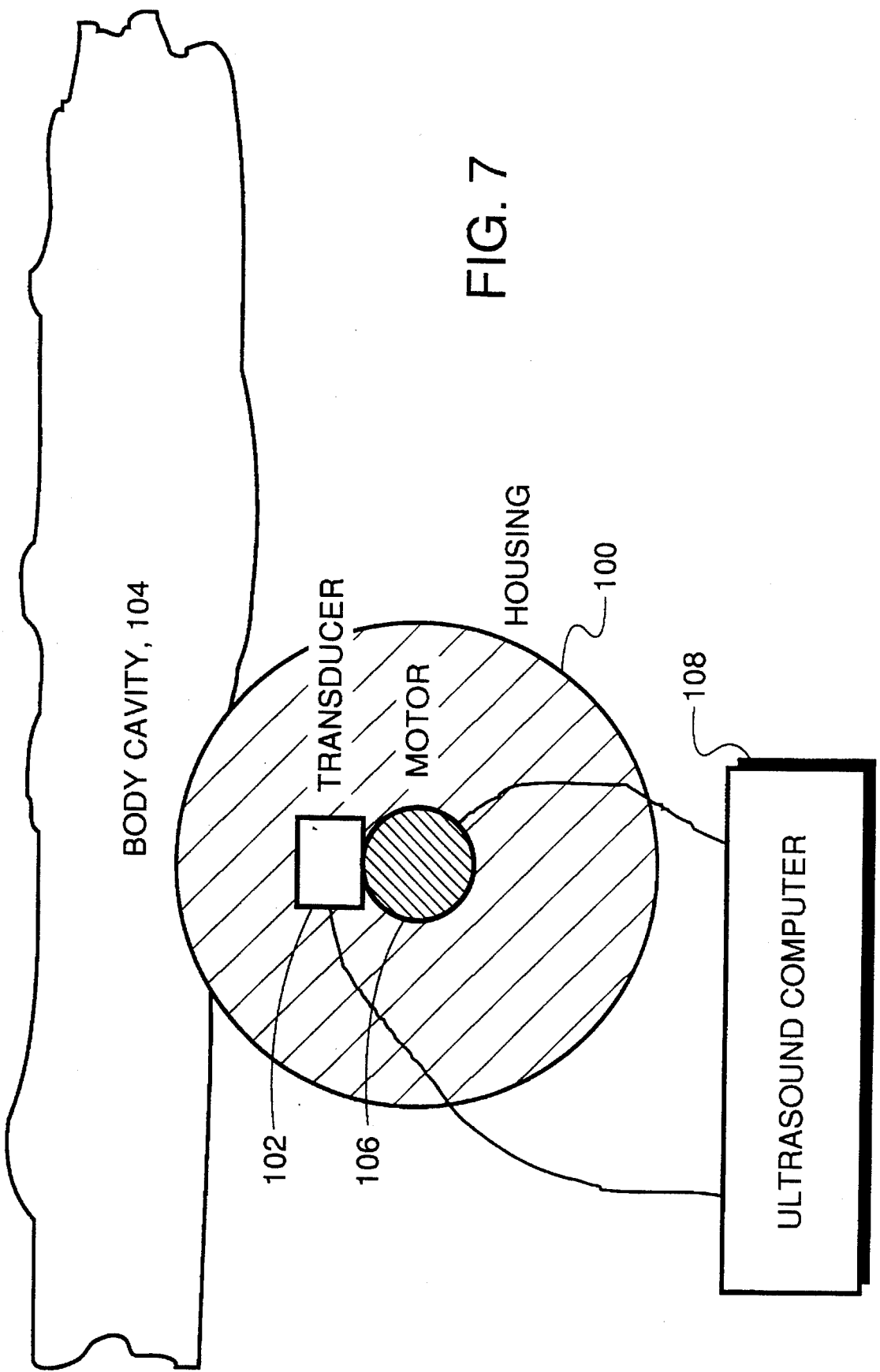

ENHANCED RESOLUTION IMAGING AND MEASUREMENT SYSTEMS

This is a continuation-in-part of U.S. patent application Ser. No. 07/977,684 filed Nov. 18, 1992, now U.S. Pat. No. 5,420,803, incorporated herein by reference.

BACKGROUND OF THE INVENTION

The invention relates to a system for enhancing the resolution of measurement and imaging systems, including for example semiconductor wafer thickness measuring systems, computed axial tomography (CAT) systems and ultrasound imaging systems.

Using current semiconductor device fabrication technology, integrated circuit manufacturers are able to produce hundreds of circuit chips from a single large wafer. Each circuit chip may in turn contain millions of devices. The devices in the circuits are typically fabricated one layer at a time, each layer associated with a different part of the underlying semiconductor device structures. For example, there may be a diffusion stage during which electrically isolated islands are created in the underlying semiconductor wafer. Then there are subsequent diffusion stages in which devices are fabricated in those islands. Near the end of the fabrication process there at least one metalization layer is formed on the wafer interconnecting all of the devices on the circuit. The stages of the fabrication process are represented by a series of masks, at fabrication process are represented by a series of masks, at least one mask for each stage of the process. Thus, there will be a mask for the isolation diffusion, masks for each of the subsequent diffusions, and at least one mask for the metalization layer.

The sequence of steps used to fabricate the various layers of the integrated circuit on the wafer are similar. In a diffusion-based fabrication process, for example, the fabrication of an individual layer might involve the following steps. First, a passivation layer is grown or deposited on the surface of the wafer. The passivation layer prevents diffusion of dopants into the underlying wafer during a subsequent diffusion step. Windows are then opened up through the passivation layer to identify those areas in which it is desired to diffuse a dopant into wafer. This is done by first depositing a photoresist (or some material sensitive to the particular energy source that is used, e.g. X-rays) on top of the passivation layer. Then, a mask having a pattern of the regions in which diffusion is not desired is imaged onto the photoresist thereby exposing the photoresist in those selected regions. The exposed photoresist is developed and the unexposed regions are dissolved away, thereby exposing the passivation layer. Next, the wafer is placed in an etchant solution. The etchant etches away the passivation layer only in those regions that are not protected by the photoresist. After the etching step is complete, the developed photoresist is removed and the wafer is placed in a diffusion furnace where dopant is diffused into the wafer in the selected regions.

Because of the large size and the complexity of the circuits now being fabricated, the masks that are used in the photolithographic process represent only a single circuit. To create many circuits on a single wafer, the photolithographic equipment uses a step and repeat technique to print many images of that one circuit over the surface of the wafer, one at a time. For each step of the step and repeat process, the equipment focuses the mask onto a different area of the wafer. This is accomplished by leveling the wafer to the focal plane of the stepper system so that the entire image of the circuit is properly in focus over the relevant region of the wafer. The optics which perform the imaging are typically only micrometers above the surface of the wafer.

This entire process depends on sophisticated, high resolution photolithographic equipment and starting material (i.e., wafers) of very high quality. If the wafers are not sufficiently flat, the photolithographic equipment will not be able to properly focus the image of the circuit onto the desired location of the wafer or, during the process of leveling the wafer to the focal plane of the stepper system, the wafer will physically strike the equipment. In either event the consequences are unacceptable.

Thus, it is very desirable to identify before the wafer is placed in the photolithographic equipment those wafers that do not meet the required level of flatness. Since the uniformity of wafer thickness is a measure of wafer flatness, some manufacturers use wafer thickness measuring instruments to identify wafers which are not within specification on flatness. One instrument for that purpose uses two capacitive probes. One capacitive probe is positioned on one side of the wafer and the second capacitive probe is positioned in alignment and at a fixed distance from the first probe but on the opposite side of the wafer. The measured capacitance is an indication of the distance of both probes from the two surfaces of the wafer. Thus, since the separation of the probes remains constant, any changes in the measured capacitance are an indication of changes in the thickness of the wafer.

The problem with such systems, however, is that resolution is not as great as desired. The probe sizes, for example, may be on the order of 4 mm square but the desired resolution is greater than that. Indeed, even if the resolution of the probes were to improve, which is likely, it would always be desirable to obtain measurements at a resolution which exceeded that of the equipment available.

One described embodiment utilizes the capacitive probes to generate the thickness measurements. Then, a programmed computer using techniques to be described herein processes that data to enhance its resolution. The technique utilizes blur functions and tensor techniques to enhance the resolution of the thickness measurements.

This technique is also applied to CAT systems and ultrasound imaging system both of which are described herein.

SUMMARY OF THE INVENTION

In general, in one aspect, the invention is an apparatus for measuring the thickness of a wafer. The system includes a chuck assembly holding the wafer; a probe assembly which measures the thickness of a region of the wafer that is aligned with the probe assembly; a motorized assembly moving either the wafer relative to the probe assembly or the probe assembly relative to the wafer and thereby enabling the probe assembly to examine a two-dimensional area of the wafer; measurement circuitry generating an image of the two-dimensional area of the wafer that is examined by the probe assembly, the image being a two-dimensional array of measurements, each measurement representing a measurement by the probe assembly of a different region of the two-dimensional area, the two-dimensional array of measurements being represented by a measured column tensor; a memory for storing the measured column tensor; and a computer programmed to left multiply the measured column tensor stored in the memory by a reconstruction tensor T to obtain an estimate of a desired measurement column tensor, wherein the reconstruction tensor T is equal to $R_{dm}R_{mm}^{-1}$, $R_{dm}$ being a cross-covariance tensor computed for d, a desired measurement column tensor, and m, the measured column tensor, and $R_{mm}$ being an auto-covariance tensor computed for m, the measured column tensor, and wherein the estimate of a desired measurement column tensor represents an estimate of measurements that would be obtained from a hypothetical probe assembly having a possibly different resolution from the first mentioned probe assembly.

Preferred embodiments include the following features. The computer is programmed to compute the cross-covariance tensor in accordance with the following relationship: $R_{dm}=B_d R_{pp} B_m^t$, where $B_d$ is a desired blur tensor characterizing the hypothetical probe assembly, $B_m$ is a measurement blur tensor characterizing the first mentioned probe assembly, and $R_{pp}$ is an physical process auto-covariance tensor characterizing the underlying wafer geometry. Also, $R_{pp}$ is equal to $\sigma_p^2 I$, where $\sigma_p^2$ is an estimate of the root-mean-square variability of the wafer geometry and I is an identity tensor. The computer is also programmed to compute the auto-covariance tensor in accordance with the following relationship: $R_{mm}=B_m R_{pp} B_m^t + \sigma_n^2 I$., where $B_m$ is a measurement blur tensor characterizing the first mentioned probe assembly, $R_{pp}$ is an auto-covariance tensor characterizing the underlying geometry of the wafer, $\sigma_n^2$ is a noise variance characterizing noise in the measurement system, and I is an identity tensor. The reconstruction tensor T is precomputed and stored in the memory.

Also in preferred embodiments, the computer is programmed to perform the left multiplication of the measured column tensor stored in the memory by a reconstruction tensor T by first calculating a Fourier transform of each ring of the measured column tensor. The computer is also programmed to model the measurement blur function as separable in two dimensions and to thereby diagonalize the $R_{mm}$ tensor in at least one dimension to facilitate computing the inverse of $R_{mm}$. In addition, the computer is programmed to represent the measurement blur function as a factorization of a first set of orthogonal blur operators to thereby diagonalize the $R_{mm}$ tensor in at least one dimension to facilitate computing the inverse of $R_{mm}$ and the computer is further programmed to represent the desired blur function as a factorization of a second set of orthogonal blur operators and to thereby diagonalize the $R_{dm}$ tensor to thereby facilitate computing the reconstruction tensor. Also, the computer is programmed to model the measurement blur function as cyclic in at least one dimension and to thereby diagonalize the $R_{mm}$ tensor in at least one dimension to facilitate computing the inverse of $R_{mm}$, and it is programmed to represent the desired blur function as cyclic in at least one dimension and to thereby diagonalize the $R_{dm}$ tensor to thereby facilitate computing the reconstruction tensor.

Preferred embodiments also include the following features. The computer is programmed to: (1) compute the cross-covariance tensor in accordance with the following relationship: $R_{dm}=B_d R_{pp} B_m^t$, where $B_d$ is a desired blur tensor characterizing the hypothetical probe assembly, $B_m$ is a measurement blur tensor characterizing the first mentioned probe assembly, and $R_{pp}$ is an physical process auto-covariance tensor characterizing the underlying wafer geometry; and (2) compute the auto-covariance tensor in accordance with the following relationship: $R_{mm}=B_m R_{pp} B_m^t + \sigma_n^2 I$., where $R_{pp}$ is an auto-covariance tensor characterizing the underlying geometry of the wafer $\sigma_n^2$ is a noise variance characterizing noise in the measurement system, and I is an identity tensor. The measurement circuitry samples the thickness of the wafer in a two-dimensional pattern characterized by a series of concentric rings and the computer is programmed to perform the following computations in computing the reconstruction tensor: (1) to diagonalize the auto-covariance tensor by computing a Fourier transform of each ring of the auto-covariance tensor; and (2) to compute a tensor inverse of the diagonalized autocovariance tensor by matrix inversion, in computing of the reconstruction tensor. The computer is programmed to perform the following additional computations in computing the reconstruction tensor: (1) to diagonalize the cross-covariance tensor by computing a Fourier transform of each ring of the cross-covariance tensor; and (2) to compute a matrix product of the tensor inverse of the diagonalized auto-covariance tensor and the diagonalized cross-covariance tensor, wherein the matrix product is a Fourier transformed reconstruction tensor. Furthermore, the computer is programmed to perform the following computations in computing the estimate of a desired measurement column tensor: (1) to diagonalize the measured column tensor by calculating a Fourier transform of each ring of the measured column tensor, and (2) to compute the left multiplication of the diagonalized measured column tensor by the Fourier transformed reconstruction tensor to generate a Fourier transformed estimate tensor; and (3) to compute the inverse Fourier transform of the Fourier transformed estimate tensor to arrive at the estimate of a desired measurement column tensor.

In general, in another aspect, the invention is a computed axial tomography (CAT) system for generating an enhanced resolution image of an object. The system includes a ring assembly surrounding a location at which the object is placed; an X-ray source mounted on the ring assembly; an array of X-ray sensors arranged on the periphery of the ring assembly for measuring X-ray intensity from the object; and a drive motor for rotating the ring assembly about the object. The invention also includes measurement control circuitry controlling the drive motor and receiving data from the array of X-ray sensors. The measurement control circuitry generates a plurality of vectors of X-ray data from received X-ray signals, each vector representing X-ray intensities measured by each of the sensors of the array of X-ray sensors and each vector representing a different angle of rotation of the ring assembly. The plurality of vectors is represented as a measured column tensor. The invention also includes a memory for storing the measured column tensor; and a computer programmed to left multiply the measured column tensor stored in the memory by a reconstruction tensor T to obtain an estimate of a desired measurement column tensor. The reconstruction tensor T is equal to $R_{dm}R_{mm}^{-1}$, $R_{dm}$ being a cross-covariance tensor computed for d, a desired measurement column tensor, and m, the measured column tensor, and $R_{mm}$ being an auto-covariance tensor computed for m, the measured column tensor. The estimate of a desired measurement column tensor represents an estimate of measurements that would be obtained from an hypothetical array of X-ray sensors having a higher resolution than the first mentioned array of X-ray sensors.

In general, in still another aspect, the invnetion is an ultrasound imaging system for generating an enhanced resolution ultrasound image of internal structure of an object. The system includes a housing; a transducer inside of the housing for sending and receiving acoustic signals; a motor drive positioning the transducer to selected angles within a range of possible angles; and measurement control circuitry controlling the motor drive, sending ultrasonic pulses through the transducer and receiving echoes from the object. The measurement control circuitry generates a plurality of vectors of ultrasonic data, each vector representing a plurality of signal samples for a given angle of the transducer, and each vector representing a different angle of the transducer. The plurality of vectors is represented as a measured column tensor. The invention also includes a memory for storing the measured column tensor; and a computer programmed to left multiply the measured column tensor stored in the memory by a reconstruction tensor T to obtain an estimate of a desired measurement column tensor. The reconstruction tensor T is equal to $R_{dm}R_{mm}^{-1}$, $R_{dm}$ being a cross-covariance tensor computed for d, a desired measurement column tensor, and m, the measured column tensor, and $R_{mm}$ being an auto-covariance tensor computed for m, the measured column tensor. The estimate of a desired measurement column tensor represents an estimate of measurements that would be obtained from an hypothetical transducer having a higher resolution than the first mentioned transducer.

This particular way of modeling and solving the problem of obtaining higher resolution images or measurements is particularly robust. Errors in modeling $R_{pp}$ and $\sigma_n^2$ do not have a strong impact on the results of the resolution enhancement processing.

Other advantages and features will become apparent from the following description of the preferred embodiment and from the claims.

DESCRIPTION OF THE PREFERRED EMBODIMENT

Figure 1:
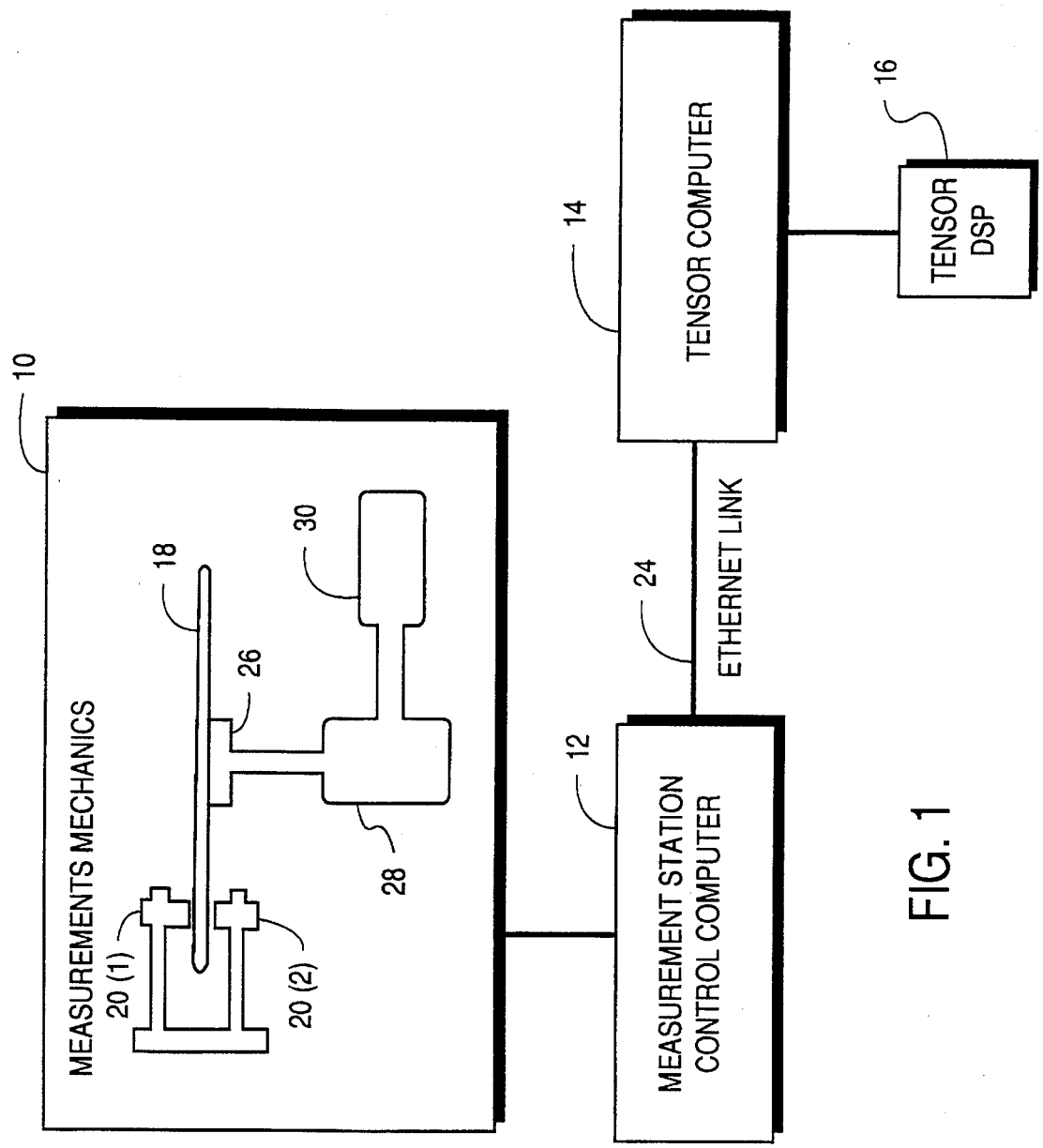
FIG. 1 is a block diagram of a wafer thickness measurement system that embodies the invention.
Figure 4:
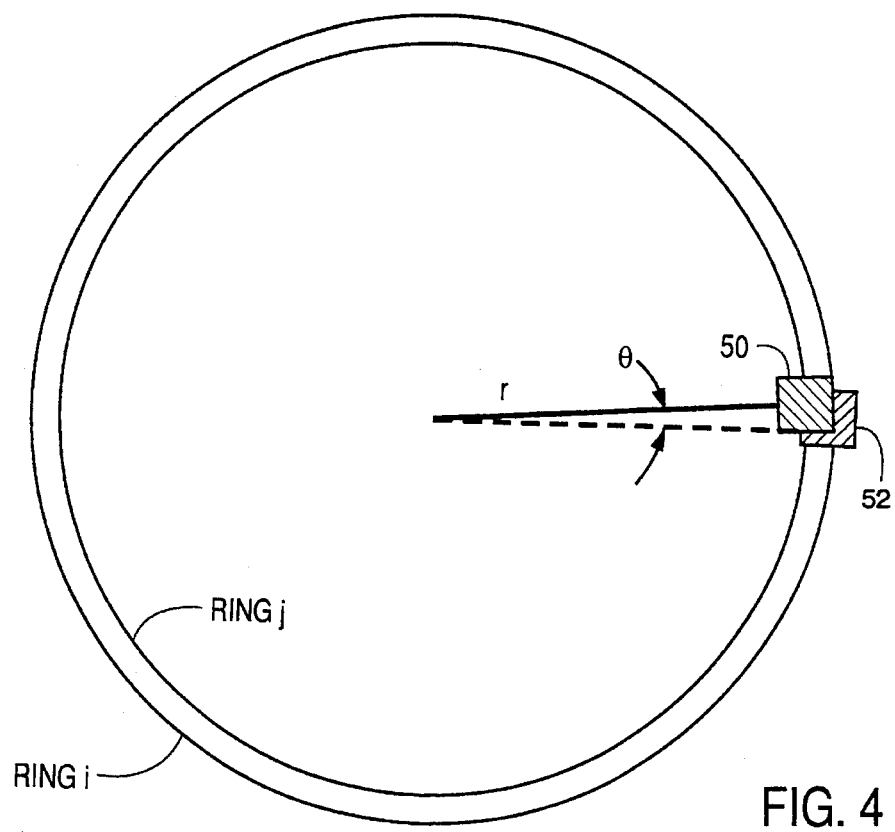
Figure 5:
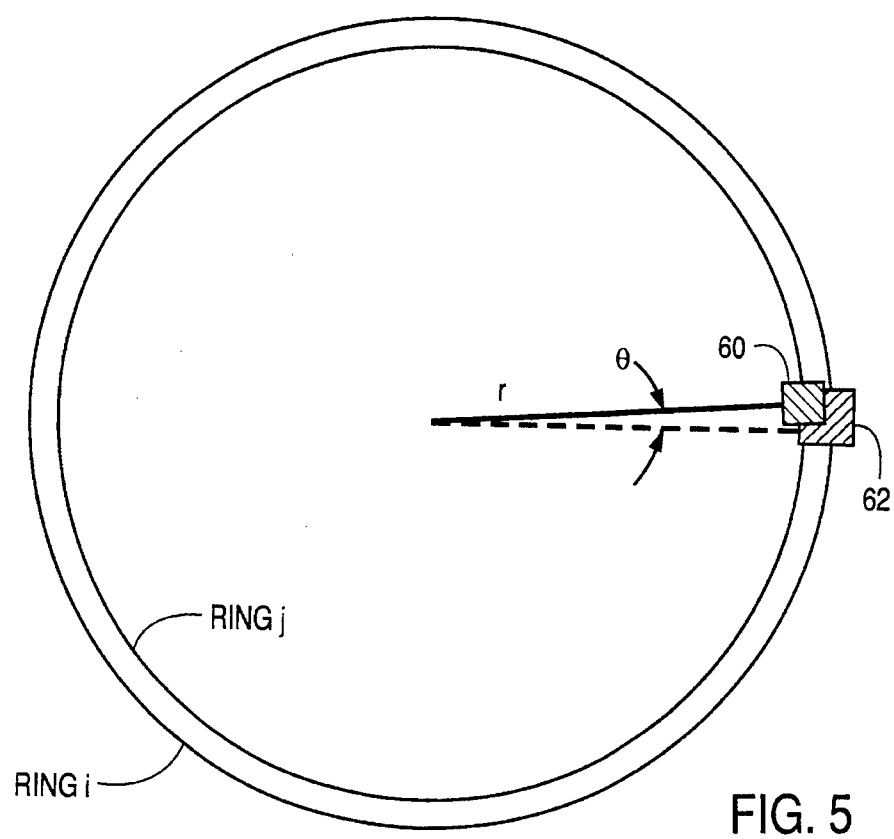
Figure 8A:
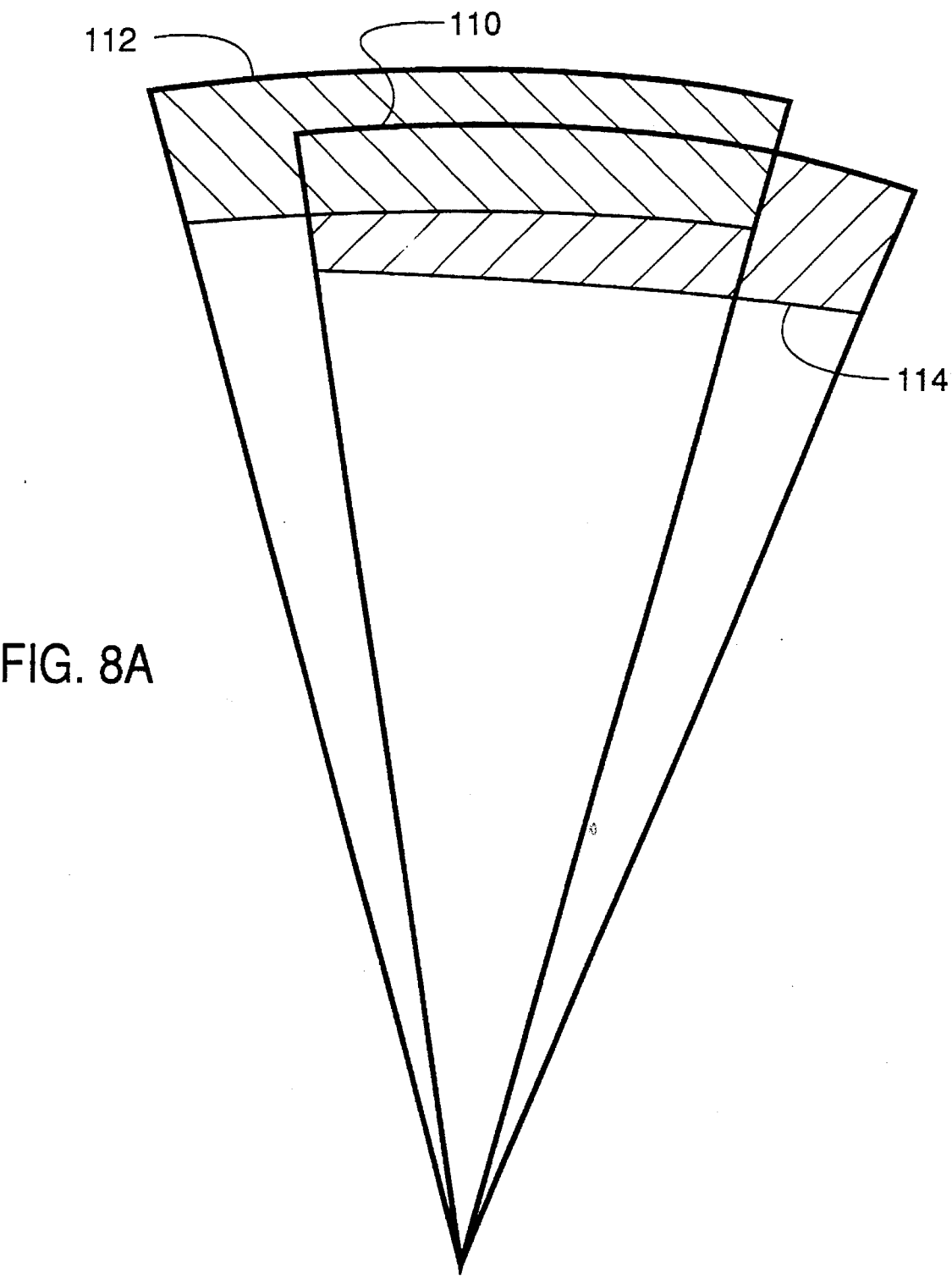
Figure 8B:
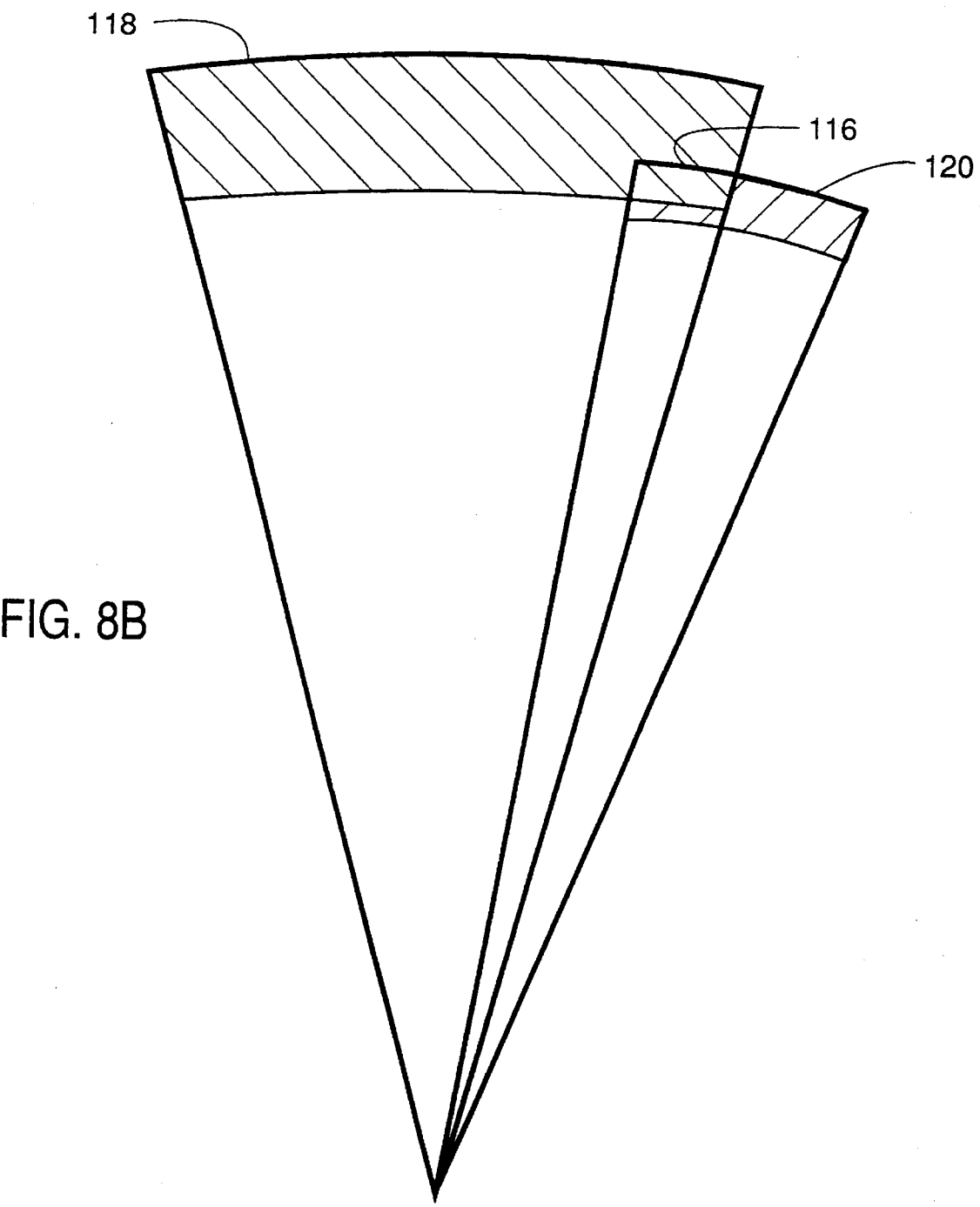
Figure 9:
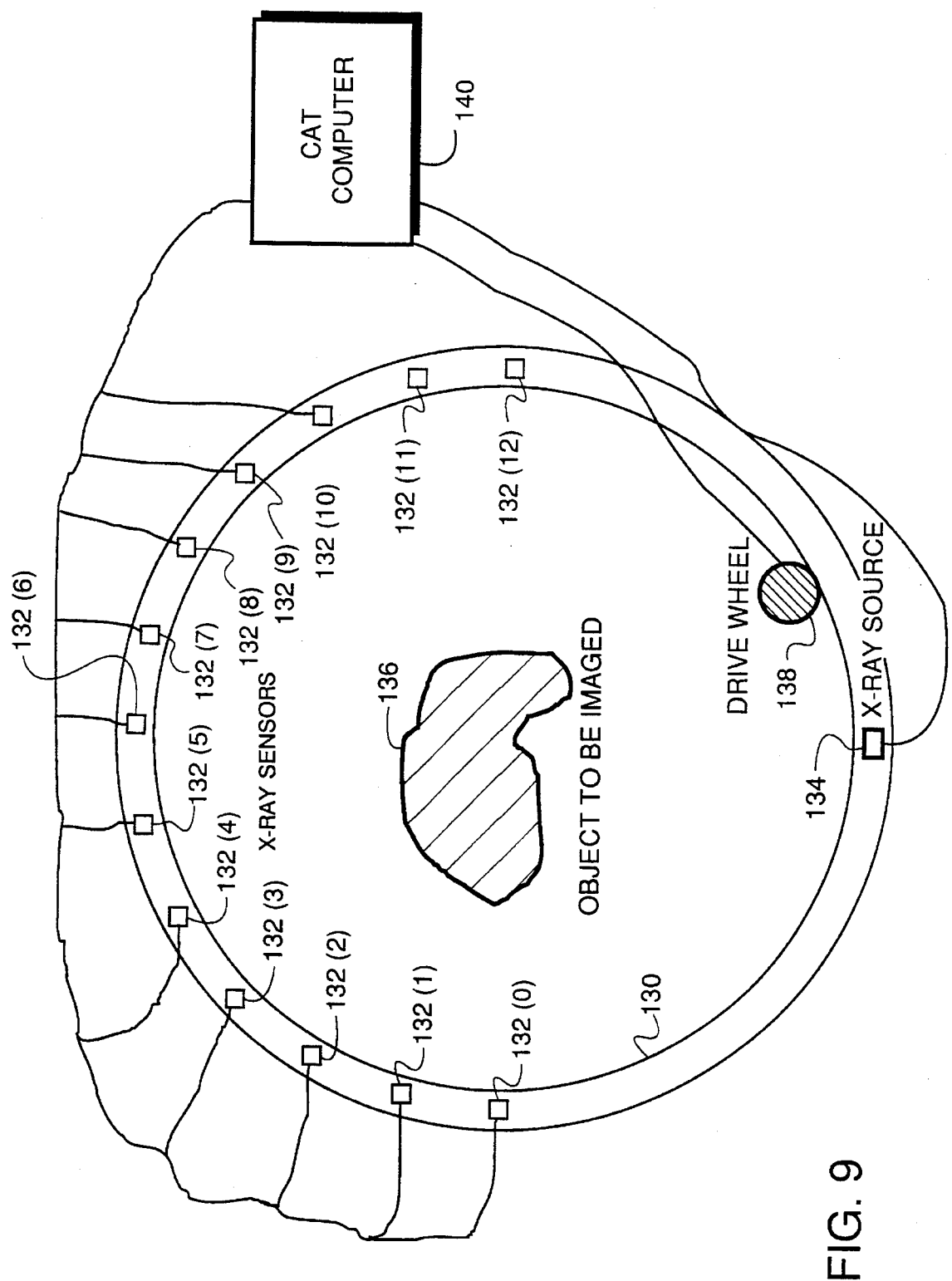
Figure 10A:
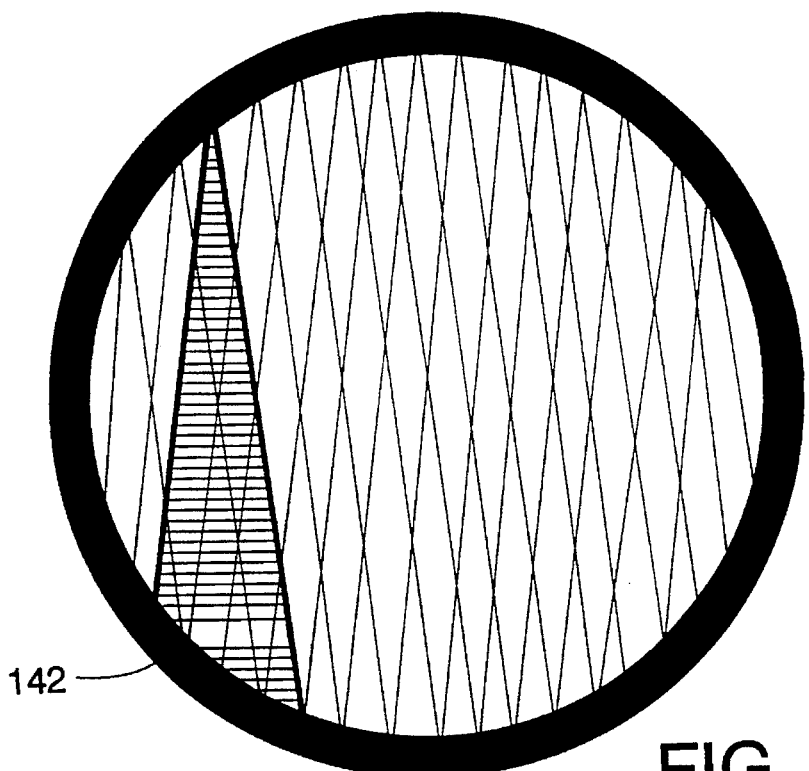
Figure 10B:
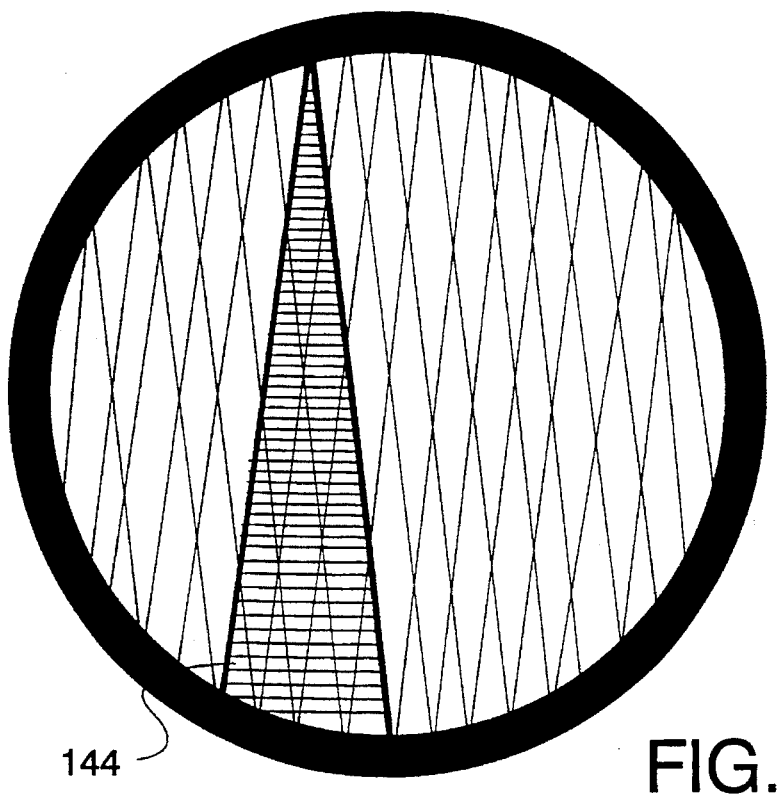
Figure 11A:
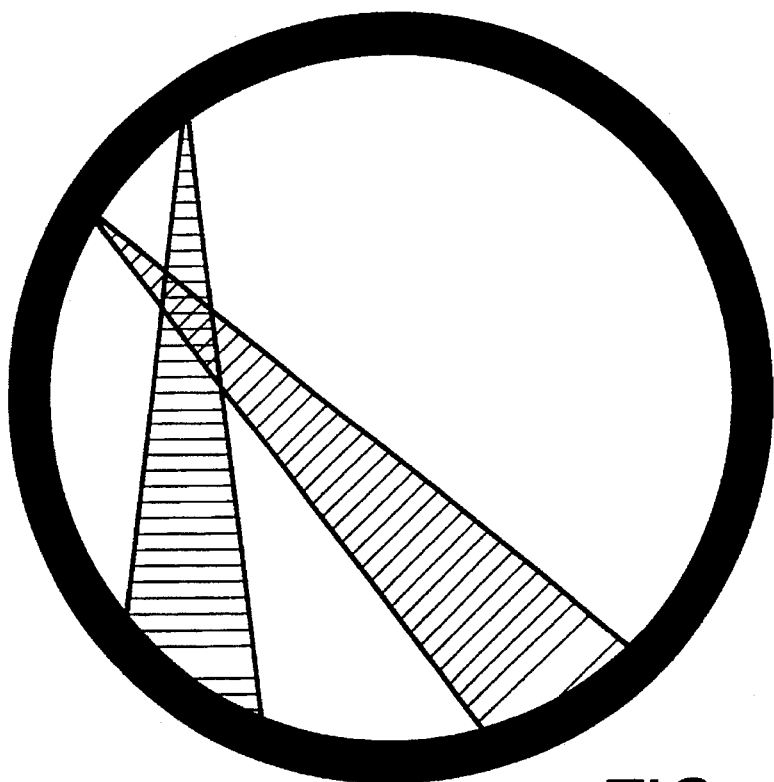
Figure 11B:
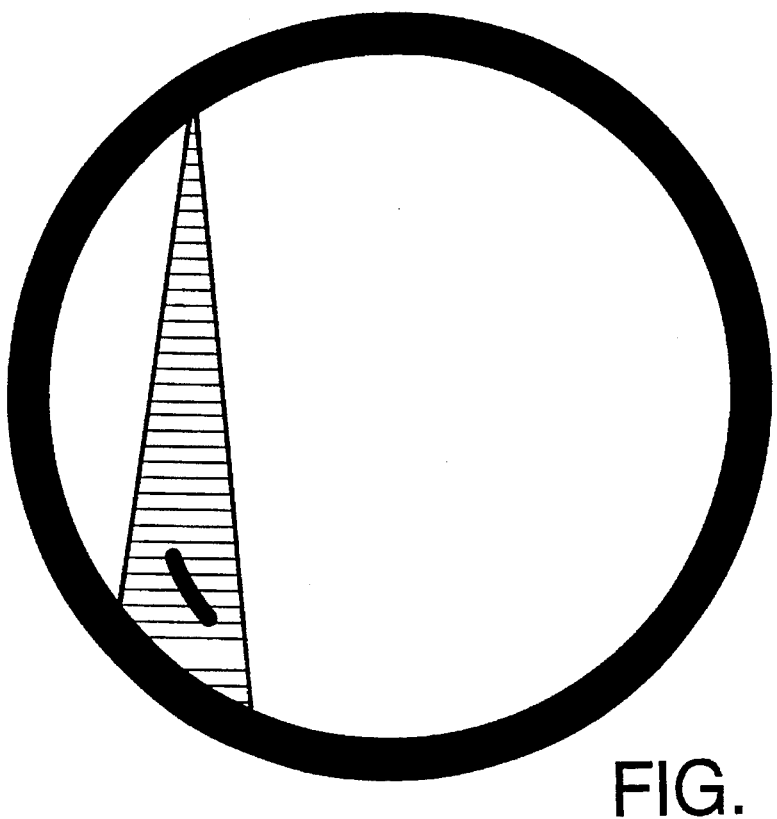
Figure 12:
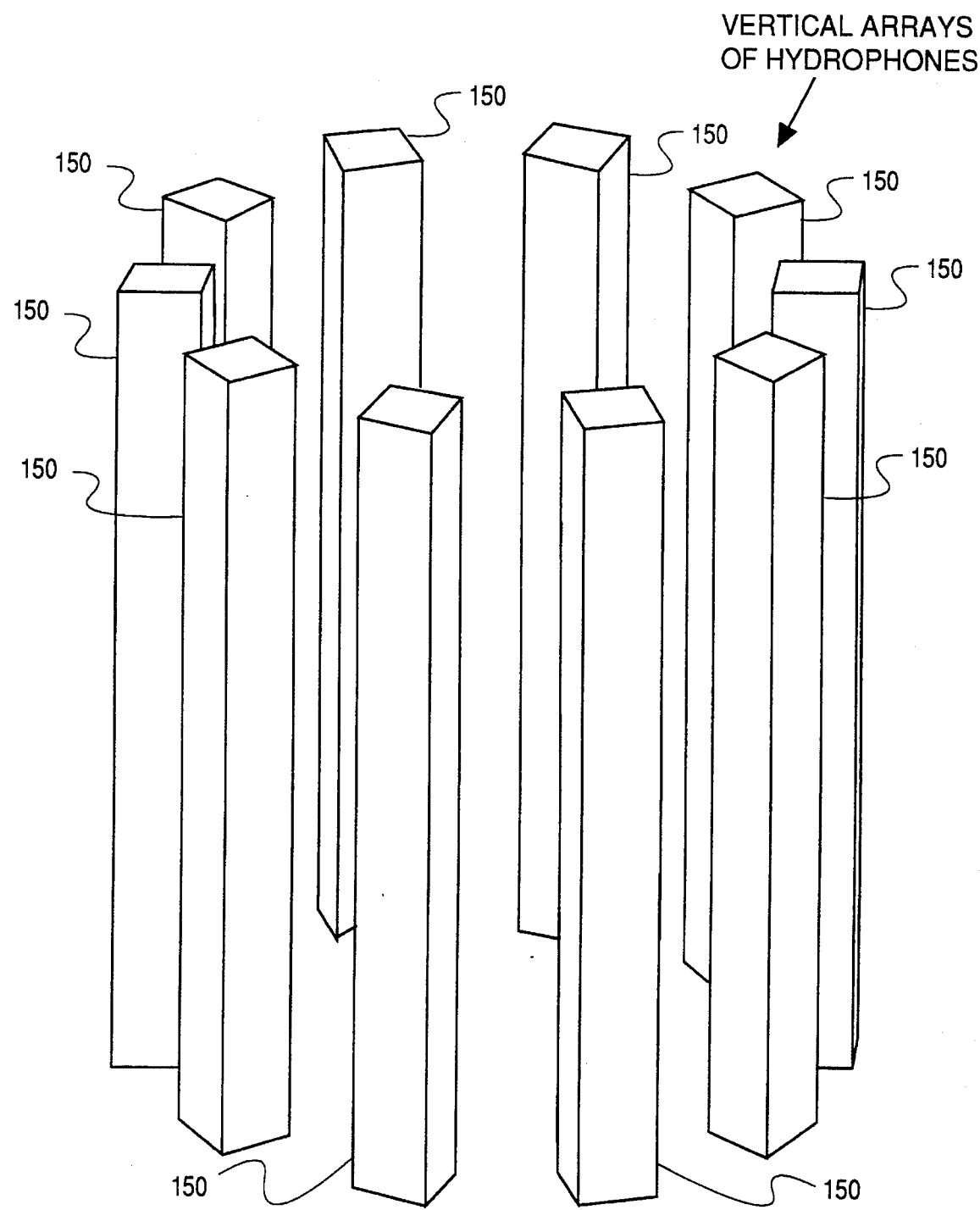
Figure 13:
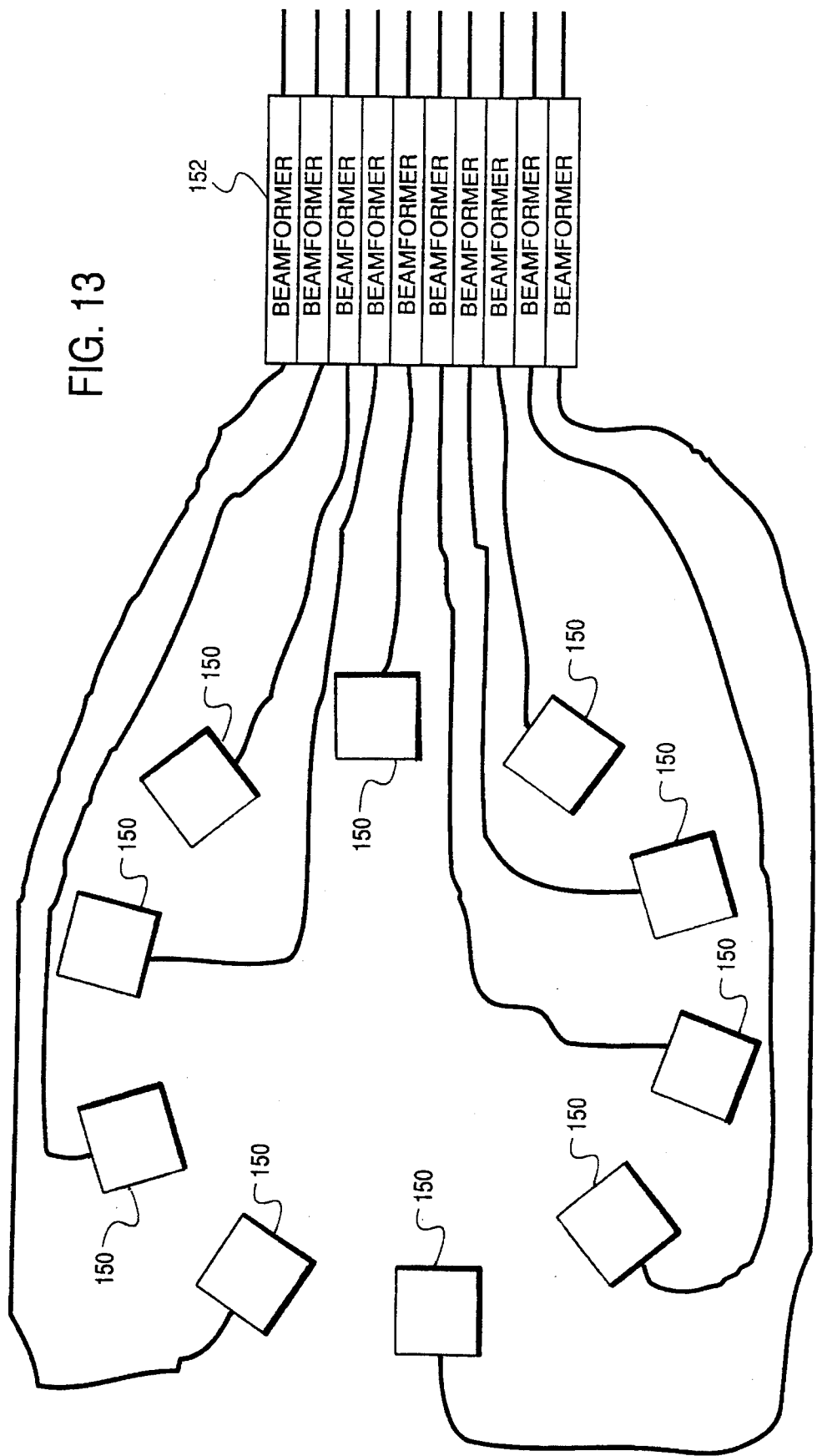

FIGS. 3a and 3b present a pseudocode description of the calculations that are performed to initialize the system shown on FIG. 1;

FIG. 4 illustrates how the probe geometry is used to generate the auto-covariance tensor;

FIG. 5 illustrates how the probe geometry is used to generate the cross-covariance tensor;

FIG. 6 presents a pseudocode description of the reconstruction operations that are performed for each full data sample;

FIG. 7 shows an ultrasound imaging setup that can be used with the invention to produce enhanced resolution ultrasound images;

FIGS. 8a and 8b show the field overlap for ultrasound imaging;

FIG. 9 shows a CAT scanner setup that can be used with the invention to produce enhanced resolution CAT scan images;

FIGS. 10a and 10b show X-Ray sensitivity fields for two sensors;

FIGS. 11a and 11b show X-Ray sensitivity overlaps;

FIG. 12 shows a vertical array of hydrophones for a staved sonar system that can be used with the invention to produce enhanced resolution sonar images; and FIG. 13 shows the data path for a staved sonar system.

STRUCTURE AND OPERATION

As shown in the functional block diagram of FIG. 1, a thickness measurement system which incorporates the invention includes a four principle subsystems, namely, measurement mechanics 10, a measurement station control computer 12, a tensor computer 14 and a tensor DSP (digital signal processor) 16. Measurement mechanics 10 includes of the mechanism and the control electronics required for moving a wafer 18 between two stationary capacitive probes 20(1) and 20(2). It also includes the electronics necessary to sample the capacitance of the probes at selected times as wafer 18 is moved about between probes 20(1) and 20(2). Measurement station control computer 12 contains software that controls measurement mechanics 10, reduces data, calibrates the electronics, provides a user interface and graphical output, and transfers data to and from tensor computer 14 over an ethernet link 24. Tensor computer 14 is a general purpose computer that serves as an intermediary between measurement station control computer 12 and tensor DSP 16. Tensor DSP 16 contains either a Texas Instruments TMS320C30 or a Western Electric DSP32C integrated circuit along with support electronics that enable it to perform 20 to 30 million floating-point operations per second (MFLOPS). Theoretically, this would enable it to perform the entire tensor processing sequence to be described below in less than a second. In reality, tensor DSP 16 rarely achieves full efficiency and requires a great deal of data shuffling, resulting in real processing times between two and twenty seconds.

In the described embodiment, the measured data consists of individual thickness measurements of a silicon wafer, sensed by a square capacitive probe assembly. The measurement platform consists of a rotatable and translatable vacuum chuck 26 that holds silicon wafer 18 at the center of the wafer, and the fixed set of capacitive probes 20(1) and 20(2) for sensing. There are two motors 30 and 28, the first one for translating vacuum chuck assembly 26 in a linear direction while the other one spins wafer 18.

The measurement platform produces a measurement pattern in the form of a series of concentric rings. The size of the probe may be 4 mm square, for example, and the resolution that is desired may be 2 mm square.

Before describing the details of the processing that tensor computer 14 performs on the measurement data, the principles underlying those calculations will first be presented.

A key concept underlying the invention is blurring. Blurring occurs in many physical processes. Prime examples include the optical blurring caused by the mis-grinding of the primary mirror of the Hubbell Space Telescope (HST), fuzzy images in medical ultrasonic testing caused by diffraction of the sound waves used for image generation, and blur in motion pictures caused by motion of the camera or motion of the object being photographed. For the present description, however, blur has a much broader meaning. Blur is defined as any linear action operating on a physical measurement. In this sense, the raw data produced by a Computed Axial Tomographic (CAT) Scanner, which in no way resembles the images we wish to see, is a blur acting on the desired image. Similarly, the outputs of the individual sensors in a phased-array radar represent a blur of the radar returns over a wide space. The key is that each measured data point is a linear combination of "ideal" physical parameters.

The processing to which the present invention pertains carries this notion one step further. We presume that we have a collection of measurements, which represents a noisy, blurred copy of a physical process. The output of the tensor computer is an estimate of a second desired blurring of the physical process.

In the described embodiment, the measurement data consists of a digitized image of an object (i.e., wafer 18). The image is generated by measuring the thickness of the wafer with capacitive sensor probes that average an area of 4 mm square. Suppose we desire, however, a measurement made by a probe 2 mm square. The tensor processing using the blur tensors described herein enables us to use the measured data, with the blur of 4 mm square capacitive plate probes, to produce a set of measurement estimates of the wafer as though they had been obtained using a probe having a 2 mm square probe.

Tensor Notation

To make this system practical, we must ensure that the processing reflects the real-world character of the items to be measured as well as the measurement process. Therefore, we treat the "ideal" system and the measurement process as stochastic, or random processes. As soon as we go to a multidimensional (e.g. two-dimensional) image, however, conventional matrix notation becomes much too complicated and unwieldy to handle the processing manipulations that must be performed. Therefore, we introduce another notation to simplify the description of the system. We begin by defining tensors, which we shall use to describe measurement data, blurring and deblurring operators.

A column tensor is an array of data. It is similar to a vector, but generalized to include multidimensional images, such as a two-dimensional image consisting of a data value for each (x, y) point of the image, or a motion picture consisting of a data value for each (x, y, t) position and frame number, or a collection of outputs from a phased-array sensor consisting of a datum for each sensor and time sample. A column tensor is characterized by having a real value for each coordinate of the form (a, b, c, . . . ). An element of a column tensor is denoted like this: $t1_{(a,b,c,\ldots)}$. A row tensor is similar, but has a different notation: $t2^{(\ldots c,b,a)}$. Notice that not only are the indices superscripts, but they are in reverse order from the column tensor.

If we find that $t1_{(a,b,c,\ldots)} = t2^{(\ldots c,b,a)}$, then we say that t1 and t2 are related by a transpose operator, so that $t1=t2^t$, and $t1'=t2$. Also note that $(t1^t)^t=t1$. Column tensors are a generalization of vectors, while row tensors are a generalization of transpose vectors. Data will generally be described as column tensors, (this is merely a convention taken from standard data processing, in which data are generally taken as column vectors rather than row vectors).

General tensors can have any ordering of row and column elements, such as: $T_{a,b,\phantom{x}e}^{\phantom{a,b,}c,d,\phantom{e,}f}$. Other than row and column tensors, there is one particular ordering style that is of importance to the blur correction problem, and that is the rectangular tensor: $t1_{a_1,a_2,\ldots,a_n}^{b_n,b_{n-1},\ldots,b_1}$. Normally, we will denote a rectangular tensor as a bold letter: T.) When the range of each of the $b_i$'s is the same as the range of the corresponding $a_i$'s, we call the particular rectangular tensor a square tensor. Rectangular and square tensors are generalizations of rectangular and square matrices.

We now discuss how to multiply tensors. The product of a row tensor times a column tensor, if defined, is a scalar:

$$x = \underline{t1}\,\underline{t2} = \sum_{a_1,a_2,\ldots,a_n} t1^{(a_1,a_2,\ldots a_n)}\, t2_{(a_n,a_{n-1},\ldots a_1)}$$

In order for this to be defined, the ranges of the tensors must match according to the summation above. This is a generalization of the fact that the product of a row vector times a column vector is a scalar (if defined at all).

The product of a column tensor times a row tensor is a rectangular tensor:

$$T_{a_1,a_2,\ldots,a_n}^{b_n,b_{n-1},\ldots,b_1} = t1_{a_1,a_2,\ldots,a_n}\, t2^{b_n,b_{n-1},\ldots,b_1}$$

The product of a rectangular tensor times a column tensor is a column tensor:

$$\underline{t1}_{a_1,a_2,\ldots a_n} = \sum_{b_n,b_{n-1},\ldots,b_1} T_{a_1,a_2,\ldots a_n}^{b_n,b_{n-1},\ldots,b_1}\, \underline{t1}_{b_1,b_2,\ldots,b_n}$$

The product of a row tensor and a rectangular tensor is a row tensor:

$$\underline{t1}^{b_1,b_2,\ldots b_n} = \sum_{a_1,a_2,\ldots,a_n} \underline{t2}^{a_n,a_{n-1},\ldots,a_1}\, T_{a_1,a_2,\ldots a_n}^{b_n,b_{n-1},\ldots,b_1}$$

The product of two rectangular tensors is a rectangular tensor:

$$T3_{a_1,\ldots,a_n}^{b_n,\ldots,b_1} = \sum_{c_1,\ldots,c_n} T1_{a_1,\ldots,a_n}^{c_n,\ldots,c_1}\, T2_{c_1,\ldots,c_n}^{b_n,\ldots,b_1}$$

We now introduce the stochastic definitions. We start with the Probability Density Function p(t) (PDF), which is the probability density of a particular received tensor t. The integral of the PDF is always one. We introduce the expectation of a function of a random tensor:

$$E(f(\underline{t})) = \int_t f(t)p(t)dt$$

Finally, we introduce the cross-covariance and auto-covariance tensors. If t1 and t2 are random tensors with joint PDF p(t1,t2), then we define the cross-covariance:

$$R_{t1t2} = E(t1 \cdot t2^t)$$

The auto-covariance tensor is a special case of the cross-covariance, and is defined:

$$R_{t1t1} = E(t1 \cdot t1^t)$$

We now introduce some facts about tensors that are very similar to facts about matrices and vectors. If R is a symmetric tensor (i.e., $R=R^t$) then there are eigentensors such that $Rt=\lambda t$, where $\lambda$ is a scalar. We say that $\lambda$ is an eigenvalue of R, and that t is the eigentensor of R of eigenvalue $\lambda$. Furthermore, let t1 and t2 be eigentensors of a symmetric tensor R with eigenvalues $\lambda_1$ and $\lambda_2$ respectively, with $\lambda_1 \neq \lambda_2$. Then $t1^t t2 = 0$, i.e., the eigentensors are orthogonal.

The identity tensor is a square tensor I, with $$I_{a_1,a_2,\ldots,a_n}^{b_n,\ldots,b_{n-1},\ldots,b_1} = \prod_{i=1}^{n} \delta(a_i - b_i)$$

Left or right multiplication by the identity tensor yields the original tensor.

A tensor is called diagonal if the following is true:

$$\Lambda_{a_1,a_2,\ldots,a_n}^{b_n,b_{n-1},\ldots,b_1} = \prod_{i=1}^{n} f(a_i)\delta(a_i - b_i)$$

A symmetric tensor R can be factored:

$$R = M\Lambda M^t$$

where $\Lambda$ is a diagonal tensor, $MM^t=I$, and the column tensors of M are the eigentensors of R and the elements of $\Lambda$ are the corresponding eigenvalues.

We define the trace of a tensor as the sum of the elements along the tensor's diagonal:

$$\text{trace}(T) = \sum_{a_1,\ldots,a_n,b_n,\ldots,b_1} T^{b_n,\ldots,b_1}_{a_1,\ldots,a_n} \prod_{i=1}^{n} \delta(a_i - b_i)$$

Solution to the Problem

We now have enough background to state and solve the problem. We assume that there is some fundamental physical process that we wish to characterize. We also assume that we have a finite measurement column tensor m (i.e., a collection of measurements) produced by a process which consists of a rectangular measurement blur tensor $B_m$ operating on the physical process column tensor p and includes with some additive noise column tensor n. That is, the process is modeled as: $m=B_m p+n$. What we really had wanted to do, however, was estimate the result of some other desired blur tensor $B_d$ operating on the physical process, calling the desired result d, i.e., $d=B_d p$. We attempt to estimate d from m by multiplying m by a reconstruction tensor T, i.e. $\hat{d}=Tm$.

We have discovered that it is possible to solve this multidimensional problem. To do so we have developed a way of constructing a reconstruction tensor for such problems. Moreover, if the blur function has particular properties, there is a practical way of solving the problem, i.e., it is possible to construct a fast algorithm for solving the problem. We have discovered, and it can be shown, that we can apply much of what is true about statistical operations on matrices to the multidimensional tensors that are defined as described herein. That is everything generalizes to these multidimensional objects.

Thus, we construct T in such a way as to minimize the expected mean-square error between the estimate of $\hat{d}$ and d itself. To do so we construct a performance index:

$$J=\text{trace}(E((T_m-d)(T_m-d)^t))=\text{trace}(E((T_m-d)(m^t T^t-d^t))).$$

J is the expected sum of squares of the reconstruction error. A reconstruction tensor T that minimizes J will produce the smallest expected mean-squared error of reconstruction, hence we elect to solve the problem of minimizing J over T. The gradient of J with respect to T will be 0 at a minimum or a maximum, so we begin by calculating this gradient:

$$\nabla_T J=2E((T_m-d)m^t)=2E(Tmm^t-dm^t)=2TE(mm^t)-2D(dm^t)=2(TR_{mm}-R_{dm})$$

Solving the tensor gradient for the column tensor is performed in just the same way as it would be performed if it were written in vector-matrix notation or as if one were taking a gradient with respect to a column vector. Thus, solving for $\nabla_T J=0$ yields the minimization, with:

$$TR_{mm}-R_{dm}=0 \rightarrow T=R_{dm}R_{mm}^{-1}$$

Normally, we assume that the measurement noise is additive, that the expected value of all tensors is 0, that there is no correlation between the noise and the process, and that the noise is stationary and white (i.e., $R_{nn}=\sigma_n^2 I$, $R_{pp}=0$).

Recall that $m=B_m p+n$, so that:

$$R_{mm}=E(mm^t)=E(B_m pp^t B_m^t+np^t B_m^t+B_m pn^t+nn^t)$$

$$R_{mm}=B_d R_{pp} B_m^t+R_{np} B_m^t+B_m R_{pn}+R_{nn}=B_m R_{pp} B_m^t+\sigma_n^2 I.$$

Also, $d=B_d p$, so that:

$$R_{dm}=E(dm^t)=E(B_d pp^t B_m^t+B_d pn^t)=B_d R_{pp} B_m^t+B_d R_{pn}=B_d R_{pp} B_m^t.$$

Substitution yields:

$$T=B_d R_{pp} B_m^t (B_m R_{pp} B_m^t+\sigma_n^2 I)^{-1}$$

This result, however, may not be very practical for many multidimensional systems. For instance, assume a typical image is 512×512 elements. This results in a reconstruction tensor T that is 512×512×512×512 elements, or a total of 68,719,476,736, which requires approximately $1.4 \times 10^{11}$ operations. On the fastest computers currently available, this would require several minutes per image, with tremendous storage requirements.

One aspect of the invention is a recognition that for particular types of blur tensor result in storage and computational requirements many orders of magnitude lower than this. The key to recognizing this lies in the following two definitions of a diagonal tensor and an identiagonal tensor.

A tensor is diagonal in its m'th index if:

$$T_{a_1,\ldots,a_n}^{b_n,\ldots,b_1}=f(a_1,\ldots,a_n,b_n,\ldots,b_1)\delta(a_m-b_m).$$

In classical linear systems theory, this corresponds to a multidimensional system that is shift invariant in some coordinate. An example is a circularly symmetric lens system. If the input is rotated by an angle about the system axis, the resultant output image is rotated by the corresponding angle, but is otherwise unchanged.

A tensor is identiagonal in the m'th index if it is diagonal in the m'th index, and:

$$\forall (a_1,\ldots,a_n,b_1,\ldots,b_n,a_m^t):$$

$$f(a_1,\ldots,a_m,\ldots,a_n,b_n,\ldots,b_1)=f(a_1,\ldots,a_m^t,\ldots,a_n,b_n,\ldots,b_1).$$

This corresponds to a blur function that is independent of the m'th coordinate.

For the described embodiment, the measured data consists of individual thickness measurements of a silicon wafer, sensed by a square capacitive probe. Since the measurement platform consists of a rotatable and translatable vacuum chuck that holds a silicon wafer at the center of the wafer, and a fixed set of capacitive probes for sensing, the measurement pattern forms a series of concentric rings. The measurement blur is caused by the non-zero physical size of the capacitive probes, which have an active area which is square 4 mm×4 mm. The blur is modelled as a simple averaging over this square area.

In a rectilinear (x,y) coordinate system, this blurring may be modelled as an averaging in the x-direction followed by averaging in the y-direction. However, the native coordinate system is polar (r,θ). In the polar coordinate system, the blurring of the measurement can also be modeled as a two-step process. First, the data are averaged in the angular direction by the width of the probe. This angular blurring is an averaging in the theta direction which varies from ring to ring, since the probe occupies a fixed physical length, whose subtended angle is inversely proportional to the radius of the arc. The resultant data are then blurred radially by the length of the probe.

We call the radial blur $B_r$ and the angular blur $B_\theta$. The radial blur tensor $B_r$ may be viewed as a matrix, since its values are independent of theta coordinate. The matrix form of this blur is Toeplitz, symmetric, with values equal to the length of probe intersecting the distance spanned between data rings. Toeplitz forms are matrices or tensors in which all minor diagonals have the same numbers and it looks much like a convolution operator. The angular blur tensor $B_\theta$ may be viewed as a collection of matrices, one for each radius. The matrix for each radius will be a cyclic, symmetric matrix with values equal to the length of probe intersecting the angle subtended between sampled points.

In this embodiment, we normally wish to "shrink" the effective size of the probe, so that we can resolve smaller features on the silicon wafer. This again may be viewed as a radial blur acting upon an angular blur, denoted $B_{rd}$ and $B_{\theta d}$. The desired blur tensors are quite similar to the physical blur tensors, with the exception that the span length is now set by the (user-specified) desired probe size, which will normally be the same size, or smaller than the physical probe size.

We assume no knowledge of the underlying wafer geometry, other than a root-mean-square (RMS) variability. In other words, we make a null hypothesis assumption. We assume that the wafer has no known physical characteristics other than a variance which is reasonably constant over the wafer surface. This is equivalent to assuming that $R_{pp}$ is an identity tensor, i.e., $R_{pp} = \sigma_p^2 I$. We simply make a reasonable guess at the measurement noise, $\sigma_p^2$.

It is relatively straight forward to generate a rough estimate of the measurement noise for the system. Persons skilled in the art typically know how to determine the noise figures for the various components in the system, i.e., the operational amplifiers, the A/D converters, etc. One need only add up these contributions to arrive at the estimate for the entire system. As it turns out, however, the results are not significantly affected by the guess.

This assumption yields a reconstruction tensor:

$$T = B_{rd} B_{\theta d} \sigma_p^2 I B_\theta' B_r' (B_{rd} B_{\theta d} \sigma_p^2 I B_\theta' B_r' + \sigma_n^2 I)^{-1}$$

$$T = B_{rd} B_{\theta d} B_\theta' B_r' \left( B_r B_\theta B_\theta' B_r' + \frac{\sigma_n^2}{\sigma_p^2} I \right)^{-1}$$

We note that each of: $B_{rd}$, $B_{\theta d}$, $B_\theta'$, and $B_r'$ is diagonal in one or more dimensions. Additionally, each of these tensors is sparse, that is very few of their elements are non-zero.

As a consequence, multiplication by these tensors requires little storage and little computation compared to the previously described method. For instance, assume that typical measurement consists of 400 points per ring, and 30 rings. The storage of each of the radial blur tensors may require a single 30×30 tensor with only 60 or so non-zero elements, and 4×400×2×30 operations, or around 96,000 operations each. The angular blur tensors may require only around 10×30 points of storage, and around 20×400×30×2 operations, or around 480,000 operations each.

The difficult part is the calculation and operation of:

$$\left( B_r B_\theta B_\theta' B_r' + \frac{\sigma_n^2}{\sigma_p^2} I \right)^{-1}$$

Here we note that the data in the angular direction are cyclic and that the last measured point of each ring is physically adjacent to the first measured point. This means that we can perform the angular blurring using Fourier transforms. This implies that: $B_\theta B_\theta' = M_{F\theta}^+ \Lambda_\theta M_{F\theta}$, where $M_{F\theta}$ is identiagonal in the radial components and is identically a Fourier transform in the angular components, and where $\Lambda_\theta$ is diagonal, real and non-negative.

Substituting, we get:

$$\left( B_r B_\theta B_\theta' B_r' + \frac{\sigma_n^2}{\sigma_p^2} I \right)^{-1} = \left( B_r M_{F\theta}^+ \Lambda_\theta M_{F\theta} B_r' + \frac{\sigma_n^2}{\sigma_p^2} I \right)^{-1}$$

Since $B_r$ is identiagonal in the angular direction and $M_{F\theta}^+$ is identiagonal in the radial direction, they commute. The same is true of transposes of these tensors, so, we find:

$$\left( B_r B_\theta B_\theta' B_r' + \frac{\sigma_n^2}{\sigma_p^2} I \right)^{-1} = \left( M_{F\theta}^+ B_r \Lambda_\theta B_r' M_{F\theta} + \frac{\sigma_n^2}{\sigma_p^2} I \right)^{-1}$$

But $I = M_{F\theta}^+ M_{F\theta}$, so:

$$\left( B_r B_\theta B_\theta' B_r' + \frac{\sigma_n^2}{\sigma_p^2} I \right)^{-1} = \left( M_{F\theta}^+ \left( B_r \Lambda_\theta B_r' + \frac{\sigma_p^2}{\sigma_n^2} I \right) M_{F\theta} \right)^{-1}$$

Inverting each of the Fourier transform tensors individually ($M_{F\theta}^+ = M_{F\theta}^{-1}$), yields:

$$\left( B_r B_\theta B_\theta' B_r' + \frac{\sigma_n^2}{\sigma_p^2} I \right)^{-1} = M_{F\theta}^+ \left( B_r \Lambda_\theta B_r' + \frac{\sigma_n^2}{\sigma_p^2} I \right)^{-1} M_{F\theta}$$

Here we note that $$\left( B_r \Lambda_\theta B_r' + \frac{\sigma_n^2}{\sigma_p^2} I \right)$$

is diagonal in the angular direction, since $B_r$ and its transpose are identiagonal in the angular direction and $\Lambda_\theta$ is diagonal. We therefore note that $$\left( B_r \Lambda_\theta B_r' + \frac{\sigma_n^2}{\sigma_p^2} I \right)^{-1}$$

can be computed as the inverse of a square tensor in the radial direction for each angular diagonal element. This implies storage of a 30×30 matrix for each of 200 points (180,000), since we assume real data, and approximately 30×30×200×2×2 or 720,000 operations. The multiplication by each of the Fourier tensors involves storage of approximately 400 points, and approximately 30×8×4000 or 960,000 operations. Thus, the total storage requirements for the system are around 200,000 data points, and the total number of operations is around 5,000,000.

The multiplications by Fourier tensors are computed as either Fast Fourier Transforms (FFT) or Winograd Fast Transforms (WFT). The existence of the FFT and WFT algorithms drastically reduces the complexity and storage requirements for calculating these products.

It should be noted that the cross-covariance and auto-covariance matrices may be measured, modeled, estimated, calculated in closed form or otherwise computed. For instance, in the described embodiment, we assume that the underlying physical process is unknown, i.e., a two-dimensional white Gaussian process. We model the sensor as a rectangle which simply averages the data in the field plus a white measurement noise. We then see that the auto-covariance function is simply the overlap of the areas of the respective probes plus the variance of the white measurement noise for the diagonal elements of the auto-covariance tensor. Similarly, the cross-covariance tensor is equal to the overlap of the areas of the respective input and output probes.

This results in approximately 5 orders of magnitude less storage and fewer operations than a straightforward implementation.

The invention involves two key aspects, namely, recognizing that a reconstruction tensor $T=R_{dm}R_{mm}^{-1}$ minimizes the expected mean-squared error of reconstruction; and fast algorithms for calculating Tm. From the above analysis, we can see that a fast algorithm exists for calculating Tm whenever $R_{mm}$ is of the form $R_{mm}=M_1M_2\Lambda M_2'^*M_n'^*$, where $M_iM_i'^*=I$, $\Lambda$ is diagonal, and each of the $M_i$ is identiagonal in at least one variable.

Figure 2A:
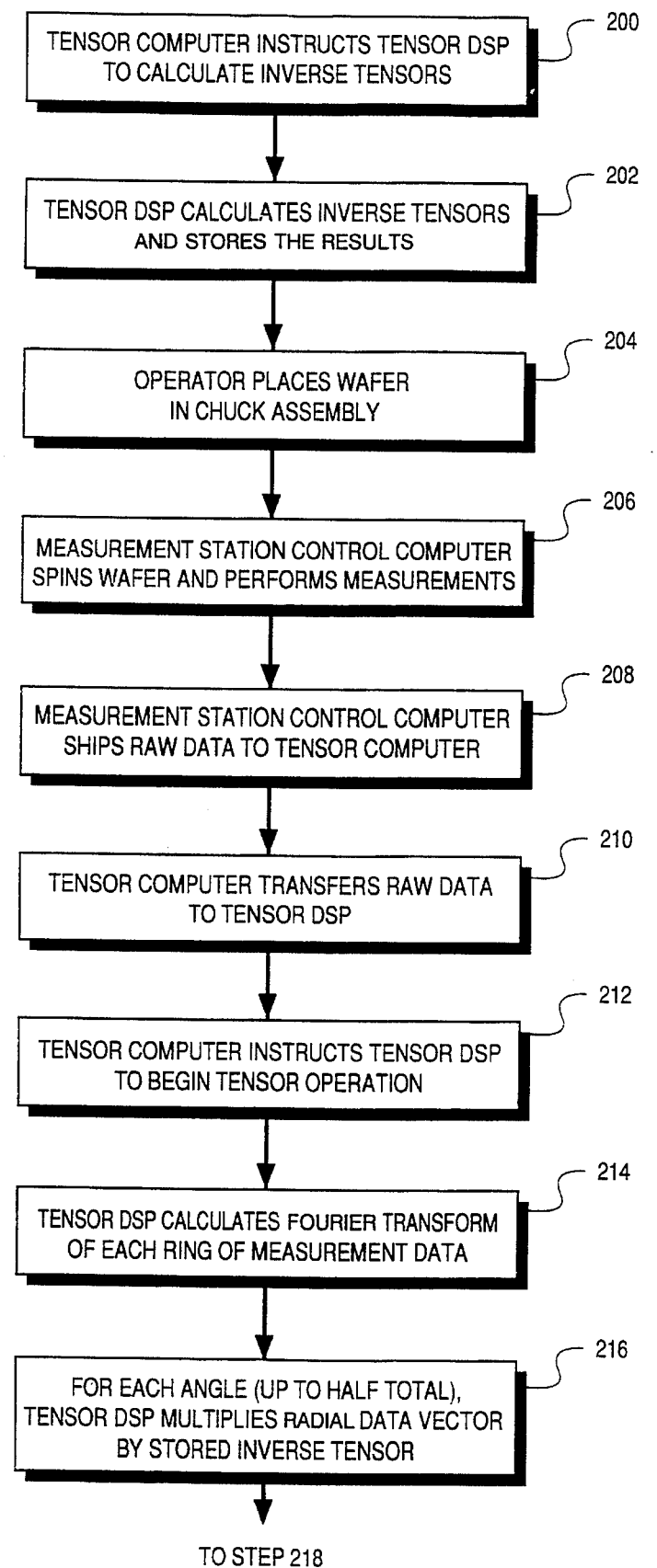
FIGS. 2a and 2b show the general sequence of steps that are performed by the system shown in FIG. 1.
Figure 2B:
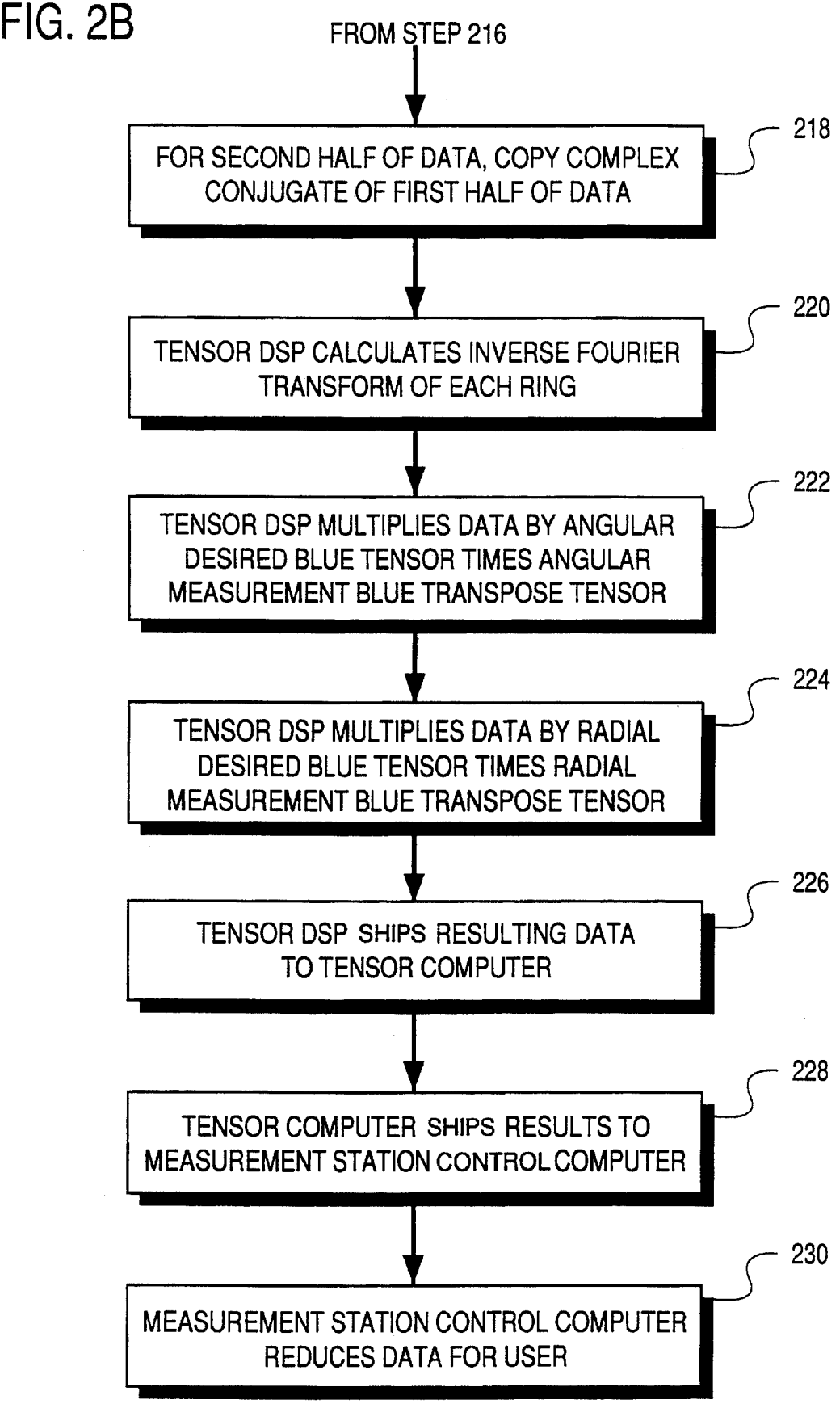

In the system shown in FIG. 1, the inverse tensor can be precomputed and stored in the tensor computer for use when the wafer thickness measurements are available. If that is done, the general sequence of steps that are performed by the system shown in FIG. 1 are as shown in FIGS. 2a and 2b. The system is first initialized. During initialization the tensor computer instructs the tensor DSP to calculate inverse tensors $$\left( B_r\Lambda_\theta B_r' + \frac{\sigma_n^2}{\sigma_p^2} I \right)^{-1}$$

and store the results for later (steps 200 and 202).

An operator places a wafer in the chuck assembly (step 204). The measurement station control computer spins the wafer between capacitive probes and collects multiple rings of wafer thickness measurement data (step 206). When all of the measurement data has been collected, measurement station control computer ships the raw data (i.e., the array of wafer thickness values) to the tensor computer via the ethernet connection (step 208). To perform the required computations, the tensor computer transfers the raw measurement data to the tensor DSP processor (step 210) and instructs the tensor DSP processor to begin tensor operations (step 212). The tensor DSP calculates the Fourier Transform of each ring of measurement data using a Winograd Fourier Transform (WFT) to minimize storage requirements and significantly improve performance (step 214). Then, for each angle (up to half the total number of angles measured), the tensor DSP multiplies the radial data vector by the stored inverse tensor (both real and complex parts) (step 216). For the second half of the data, the tensor DSP copies the complex conjugate of first half of data (since input and output data are real) (step 218). Then, the tensor DSP calculates the inverse Fourier Transform of each ring (step 220). The tensor DSP multiplies the resulting data by the angular desired blur tensor times angular measurement blur transpose tensor (i.e., $B_{\theta_d}B_\theta'$) (step 222). The tensor DSP then multiplies the data by the radial desired blur tensor times radial measurement blur transpose tensor (i.e., $B_{rd}B_r'$) (step 224).

The tensor DSP ships the results of that last calculation to the tensor computer (step 226). The tensor computer, in turn, ships the data to the measurement station control computer (step 228). Finally, the measurement station control computer reduces data for user, e.g. either displaying the data on a video screen or printing it in a convenient format for the system operator (step 230).

Note that in the above-described sequence of steps, the angular and radial blurring may be combined, Fourier transformed and then interchanged with step 220. This alternative approach is illustrated in the pseudocode described below.

Detailed Algorithm of Tensor Estimator Example

The precalculation or initialization can be performed prior to making the wafer thickness measurements. If we assume the form of the measurement and desired blur tensors, as we did above, it is straight forward to compute the elements of the auto-covariance and cross-covariance tensors ahead of time. Pseudocode for the operations to compute the elements of these tensors are shown in FIGS. 3a–b.

The elements of the auto-covariance tensor are designated rmm[theta][i][j]. Element rmm[theta][i][j] is equal to the expected value of measured data at ring number i, angle value of 0 times measured data at ring number j, angle value of theta. Under normal assumptions, this expectation value is presumed to be based upon a white physical process sampled by a square averaging probe plus white noise. Thus, it is simply equal to the area of overlap between squares positioned at the appropriate locations.

Referring to FIG. 4, the electronic footprint of the capacitive probe is modeled as a square 50 slightly larger than the physical area of the capacitive probe, centered at the (r,θ) coordinate point, and oriented such that the radius of the coordinate system is perpendicular to two sides of the square. To compute the element rmm[θ][i][j], one such square 52 is positioned at the radius corresponding to ring number i, at an angle of 0, and the other square 50 is positioned at the radius of ring number j, at an angle of θ. The area of overlap between the two squares is computed and placed in rmm[θ][i][j].

In the special case when i=j and θ=0, the noise variance, $\sigma_n^2$, is added to the computed area of overlap and the result is stored in rmm[0][i][i].

In the case illustrated in FIG. 4, i corresponds to a radius of 30 mm, j corresponds to a radius of 28 mm and theta corresponds to 1.8 degrees. The input probe area is 4 mm on each side. One probe is placed at the first location and another probe is placed at the second. The area of overlap between the two probes is the value of rmm[θ][i][j]. Note that for most combinations of i, j and theta the overlap is zero.

The elements rdm[θ][i][j] of the cross-covariance tensor $R_{dm}$ are computed similarly. The element rdm[θ][i][j] is the expected value of the desired data at ring number j, angle value of theta times the measured data at ring number i, angle value of 0. As with the auto-covariance tensor, under normal assumptions this expectation value is presumed to be based upon a white physical process sampled by a square averaging probe. Thus, it is simply equal to the overlap between the two different sized squares positioned at the appropriate locations.

Referring to FIG. 5, the desired footprint of the capacitive probe is modeled as a rectangle 60, centered at the (r,θ) coordinate point, and oriented such that the radius of the coordinate system is perpendicular to two sides of the rectangle. The dimensions of the rectangle are user-specified. This rectangle 60 is positioned at the radius of ring number j, with an angle of theta. A square input area 62 is positioned at the radius of ring number i, with angle of 0.

The area of overlap between the rectangle 60 and the square 62 is computed and placed in rdm[θ][i][j].

In the case illustrated in FIG. 5, i corresponds to a radius of 30 mm, j corresponds to a radius of 28 mm and theta corresponds to 1.8 degrees. The input probe area is 4 mm on each side. The desired output probe area is 2 mm in the radial direction and 3 mm in the angular direction (these dimensions are specified by the user). The input probe 62 is positioned at the first location (i,0)=(30 mm, 0 degrees) and the output probe 60 is positioned at the second location (j, theta)=(28 mm, 1.8 degrees). The area of overlap is calculated and placed in rdm. Again it should be noted that for most combinations of i, j and theta the overlap is zero.

Referring to FIGS. 3a–b, the tensor computer computes the values for rmm[θ][i][j] and the values of rdm[θ][i][j] for all values of i, i and theta (steps 240 and 242).

Since the coordinate system for the sampled data is polar, we go to the Fourier transform domain to simplify the computations that are required. The Fourier transform is computed for each ring of rmm and rdm (steps 244 and 246). The results are saved to the matrices Rmm[θ][i][j] and Rdm[θ][i][j], respectively (steps 248 and 250). Then, for each theta two new matrices are temporarily defined, namely T1[i][j] and T2[i][j] (steps 252 and 254). The elements of T1 are set equal to the elements of Rdm[θ] and the elements of T2 are set equal to the elements of Rmm[θ]. Then, T2 is inverted and the results stored as another matrix T3 (step 256). In the last step, a matrix product of T1 and T3 is computed and stored as the theta element of a reconstruction matrix designated ReconstructorMatrix[θ] (step 258).

These operations are repeated for each theta. The resulting reconstructor tensor is an array of matrices, one for each FFT bin. The matrices of the reconstructor tensor are stored for later use when the measurement data is available.

The measurement station control computer, using the measurement mechanics, measures the thickness of the wafer and sends the resulting array of thickness measurements to the tensor computer over the ethernet. The tensor computer, in turn, instructs the DSP processor to perform the computations necessary to enhance the resolution of the raw wafer thickness measurement data.

Referring to FIG. 6, the tensor DSP uses the precomputed $R_{dm}$ and $R_{mm}^{-1}$ tensors to perform the requested computations. First, the tensor DSP calculates the FFT (Fast Fourier Transform) for each ring of measurement data and stores the results in the elements of a matrix named TransformedDataRing[ ][ ] (step 260). Then, the tensor DSP computes the matrix product of the reconstructor matrix and the transformed measurement data. It performs this computation for each angle theta. First, it stores the values of TransformedDataRing[i][theta] into a temporary vector TempVector1[i] (step 262). After all data is stored in the new temporary TempVector1[ ] for a given theta, the tensor DSP computes the product of the reconstructor matrix and the temporary vector and stores the results in a second temporary vector variable called TempVector2[i] (step 264). Tensor computer then replaces the contents of TransformedDataRing[i][theta] with the contents of TempVector2[i] (step 266).

After the tensor computer has performed the above operations for all theta, it computes for each ring the inverse Fourier transform of TransformedDataRing[i] and stores the results in a vector OutputDataRing[i] (step *). The contents of OutputDataRing[ ] represent the transformed data, i.e., the higher resolution thickness measurement that one would have expected using the smaller capacitive probe.

Note that the mathematical operations described above (e.g. the Fourier transforms, the inverse Fourier transforms, matrix inversions and matrix-matrix and matrix-vector products) can be performed using any of the variety of the commercially available software applications designed for performing such calculations.

Constrained Estimation

Occasionally the need will arise for a tensor estimator with operating constraints. For instance, it may be desirable that an input with a constant DC value produce an output with the same DC value. This technique is also applicable in cases where a certain known input should produce a similarly known output, yet the output of the previously derived estimator is in error due to errors in modeling. This is particularly possible in the case of non-stochastic inputs such as edges of objects which simply cannot be modeled accurately via auto-covariance tensors. To provide estimation in this case, we use the technique of generalized Lagrangian multipliers, which produces the modified performance index:

$$J = \text{trace}((Tm-d)(Tm-d)^t) + \text{trace}(\lambda(Tt_r - t_d)^t)$$

where $t_r$ is the input constraint tensor set, with multiple input values adjoined as column tensors and $t_d$ is the output constraint tensor set similarly arranged. $\lambda$ is the modified Lagrangian multiplier tensor as a column tensor. Taking the gradient of J with respect to $T^t$ yields:

$$\nabla_{T^t} J = 2(TR_{mm} - R_{dm}) + \lambda t_r^t.$$

Minimization of J is accomplished by setting this gradient to 0, which yields:

$$T = \left( R_{dm} - \frac{\lambda}{2} t_r^t \right) R_{mm}^{-1}$$

Setting $Tt_r = t_d$, we solve for $\lambda$:

$$\left( R_{dm} - \frac{\lambda}{2} t_r^t \right) R_{mm}^{-1} t_r = t_d,$$

so $$\frac{\lambda}{2} t_r^t R_{mm}^{-1} t_r = R_{dm} R_{mm}^{-1} t_r - t_d,$$

yielding:

$$\lambda = 2(R_{dm} R_{mm}^{-1} t_r - t_d)(t_r^t R_{mm}^{-1} t_r)^{-1}.$$

Substituting this value back into the equation for T yields:

$$T = (R_{dm} - (R_{dm} R_{mm}^{-1} t_r - t_d)(t_r^t R_{mm}^{-1} t_r)^{-1} t_r^t) R_{mm}^{-1}.$$

It should be noted that if there exists a fast algorithm for calculating the unconstrained T (i.e. an identiagonal factorization of $R_{mm}^{-1}$), then the constrained T will also have a fast algorithm, since each of the interior terms $(R_{dm} R_{mm}^{-1} t_r - t_d)$, $(t_r^t R_{mm}^{-1} t_r)^{-1}$ and $t_r^t$ is small-dimensioned.

Alternative embodiments:

There are many other applications in which the principles underlying the above-described invention could be used to enhance the resolution of the system. It is convenient to group these other applications into three categories, which we shall identify as class 1, class 2 and class 3 applications.

The simplest class of appropriate alternative applications (i.e., the class 1 applications) are those in which the problem is inherently one-dimensional, or consists of a very small number of data points in a multidimensional case.

An example of a class 1 application would be the imaging of a long line marked on a silicon wafer, which is illuminated at a wavelength of 880 nM, and which must be reimaged as if illuminated at a wavelength of 10 nM. In this case, the optical transfer function of interest is only the blur in the direction perpendicular to the line, with no compensation of the blur in the direction parallel to the line.

Another example of a class 1 application would be for measuring time of flight of an ultrasonic pulse. This is a one-dimensional application, in which an ultrasonic pulse is transmitted through a medium, and the return echo is captured on a computer. Knowing the blur function of the material and transducer, we can isolate the time of the reflected pulse extremely accurately.

Target identification and location via sonobuoy is a class 1 example, as this consists of time series data from a small number of sonobuoys. The dimensions here would be time sample number and sonobuoy number. Since the number of sonobuoys is small, this fits the requirements of class 1.

An application that is not class 1 is appropriate if: $R_{mm}$ is of the form $R_{mm}=M_1 M_2 \Lambda M_2'^* M_1'^*$, where $M_i M_i'^* I$, $\Lambda$ is diagonal, and each of the $M_i$ is identiagonal in at least one variable. There are at least two distinct classes of applications that satisfy these requirements, identified below as the class 2 and class 3 applications.

Class 2 applications are those in which the blur function/ auto-covariance tensor is inherently in the form of a factorization of orthogonal blur operators. In this case, we must have an application that is characterized by a blur that is a function of only one dimension, followed by blurs that are only functions of other dimensions.

An example of a class 2 application would be synthetic aperture radar or sonar, in which one blur function is the range scanning blur function, one blur function is the azimuth scanning blur function, and the final blur function is the elevation blur function (the synthetic direction of motion). These blur functions are simply cascaded, and each blur function involves only one of each of the dimensions of range, azimuth and elevation. Therefore, the auto-covariance tensor factors into the identiagonal eigentensors of each of the individual blur functions and the compounded eigenvalues of each operator.

A second example of a class 2 application is Magneto-Resonant Imaging (MRI). In that case, the blur function consists of a concatenation of the Fourier transform in the x-direction with a Fourier transform in the y-direction.

Class 3 applications are those in which there is an obvious eigenfactorization of one or more dimensions of the auto-covariance tensor. A particular example of this is any system in which the data are sampled in a polar coordinate system that shows no angular preference (a rotation of the input data results in a simple rotation of the output data, with no other changes, and one in which the noise distribution is independent of angle).

The capacitive gauging application is an example of both a class 2 and a class 3 application: the data are sampled on a polar coordinate grid, which is independent of theta, and is cyclic, which results in an eigenfactorization of the theta dimension by a Discrete Fourier Transform (DFT). Furthermore, the algorithm is made faster by implementing the DFT as a Fast Fourier Transform (FFT).

Another example of a class 3 application is ultrasonic imaging, which scans data over range and azimuth angle, in which the azimuth blur function is independent of the angle, and is cyclic, resulting in an eigenfactorization of the theta dimension by a DFT. Again, this particular application can be made even faster via a Fast Fourier Transform (FFT) implementation.

The ultrasonic imaging application is essentially identical to the preferred embodiment capacitive sensing system, with the exception of the calculation of the auto-covariance and cross-covariance ring sequences. In the ultrasonic imaging case, these are not rings, but time series of the ultrasonic echo. The auto-covariance sequence for a given angle would consist of the pulse dispersion auto-covariance function for the transmitted pulse. We also assume a white measurement noise, and so add the measurement variance to the diagonal terms of the auto-covariance tensor. We would typically also want to use a much narrower effective pulse for the output data, in order to gain greater spatial resolution. This would imply that the cross-covariance series would be given by the cross-product of transmitted pulse and desired effective transmitted pulse.

FIG. 7 shows the physical setup of the ultrasound imaging system. The plastic housing 100 containing a transducer 102 is acoustically coupled to the body cavity 104 to be imaged by pressure and ultrasonic couplant gel. A motor 106 positions the transducer 102 to the desired angle under computer control. When the transducer 102 is in the desired position, a pulse is transmitted, and the echoes monitored by the computer 108, which includes components corresponding to those previously described in connection with the capacitive probe measurement system shown in FIG. 1. The raw data are monitored sensor values as a function of angular position and time from pulse transmission.

Motor 106 positions transducer 102 to a variety of sensing angles, enumerated $n_1=1, 2, 3, \ldots, n_x$. At each angle, an ultrasonic pulse is transmitted from transducer 102. The transducer is then monitored and digitized at a fixed sample rate, with indices $n_2=1, 2, 3, \ldots, n_y$. Normally, this time series will begin long before any echo from a target is expected, and will terminate long after any far echos have arrived. The resulting data are treated as a column tensor: $D_{(n_1,n_2)}$. The autocovariance tensor used in the reconstruction calculations will be: $(R_{rr})_{(n_1,n_2)}^{(n_3,n_4)}=(O_{rr})_{(n_1,n_2)}^{(n_3,n_4)}+\sigma^2 I$, where each element $(O_{rr})_{(n_1,n_2)}^{(n_3,n_4)}$ is the expected value of the product of two pulse returns, between a measured echo set at angle numbered $n_1$, time sample $n_2$, and a measured echo set at angle numbered $n_4$ and time sample $n_3$. This expected value as calculated based upon a target which assumed to be a white Rayleigh scatterer, with a certain minimum and maximum distance from the sensor. $\sigma^2 I$ is the noise variance times target distance assumptions permit an approximation that the autocovariance tensor is cyclic in $n_2$, $n_3$, permitting approximate factorization by Fourier Transform.

The cross-covariance tensor between output and input will be:

$$(R_{dr})_{(n_1,n_2)}^{(n_3,n_4)},$$

which is calculated based upon the desired output pixel pattern. Normally, the pixel pattern will be a regular array of rectangles at locations within the arc spanned by the ultrasound pulses, numbered according to $n_1$, $n_2$. The cross-covariance tensor is calculated as the expected product of desired output rectangle numbered $n_1$, $n_2$ and the received pulse data for angle numbered $n_4$, time sample number $n_3$.

Calculation of the reconstruction tensor, constraint and final estimates the proceeds exactly as in the capacitive gauging application, substituting motor position number for ring number, time sample number for theta position, and expected products for area of overlap.

FIGS. 8a and 8b demonstrate field overlap for the ultrasound imaging application. FIG. 8a demonstrates the area of overlap 110 for integration between two different sensed portions 112 and 114, comprising rmm. Whereas, FIG. 8b demonstrates the area of overlap 116 for integration between a sensed portion 118 and a desired output portion 120, comprising rdm, also demonstrating the desired improvement in spatial resolution for output.

Computed Axial Tomography (CAT) is an example of another class 3 application, which is sampled in the radial and angular directions, with the angular blur being independent of the angle, resulting in an eigenfactor of the angular dimension by a DFT.

FIG. 9 shows the physical layout of the CAT device. A ring 130 supports on its periphery the X-Ray sensors (e.g. Gamma cameras) 132(0)–132(12) and an X-Ray source 134. An object 136 that is to be viewed is placed in the center of the ring 130. The entire ring structure can be rotated by a drive wheel or motor 138 while the object to be viewed remains stationary. A CAT computer 140 controls all elements of the data gathering. The CAT computer 140 turns on the X-Ray source 134, samples the outputs of the X-Ray sensors 132(0)–132(12) and saves the results. The source 134 is then turned off, the ring 130 rotated by a small angle, and the measurement repeated. This is done for a large number of angles.

The data are collected in a sequence. The data consist of a vector of data for each angle of rotation of the source/sensor apparatus. The vector for each angle consists of the X-ray intensity of each of a number of sensors. The ring is sent to its home position, the X-ray source is turned on, and the measurements of the gamma cameras $n_1=1, 2, \ldots, n_c$ are taken. The wheel is rotated by a fixed amount and another set of measurements is taken. We achieve a set of measurements from the wheel positions $n_2=1, 2, \ldots, n_w$. The resulting data are treated as a column tensor: $D_{(n_1,n_2)}$. Normally, the angular spacing of wheel rotations will be constant, and return to the home position. This ensures that the data are cyclic in $n_2$.

If we assume a white physical process, we find that the auto-covariance tensor is the variance of the measurement noise times the identity tensor plus a tensor which corresponds to the integral of the product of the X-ray fields sensed by each sensor. The autocovariance tensor used in the reconstruction calculations will be: $(R^{rr})_{(n_1,n_2)}^{(n_3,n_4)}=(O_{rr})_{(n_1,n_2)}^{(n_3,n_4)}+\sigma^2 I$, where each element of $(O_{rr})_{(n_1,n_2)}^{(n_3,n_4)}$ is the weighted area of intersection between a beam at camera $n_2$, wheel position $n_1$ and a beam at camera $n_4$, wheel position $n_3$ (see FIGS. 9, 10a and 10b). $\sigma^2 I$ is the noise variance times the identify tensor. It should be noted that the autocovariance tensor is cyclic in $n_2$, $n_3$, permitting factorization by Fourier Transform.

The cross-covariance tensor will equal the integral of a frustrum-shaped (an area bounded by arcs of two concentric circles and two radial lines) constant corresponding to the output image intensity area times the corresponding X-ray field for the input sensor. The cross-covariance tensor between output and input will be: $(R_{dr})_{(n_1,n_2)}^{(n_3,n_4)}$, which is calculated based upon the desired output pixel pattern. Normally, the pixel pattern will be a regular array of rectangles at locations within the ring, numbered according to $n_1,n_2$. The cross-covariance tensor is calculated as the weighted area of intersection between desired output rectangle numbered $n_1,n_2$ and the camera response beam for camera number $n_4$, wheel position $n_3$. Calculation of the reconstruction tensor, constraint and final estimates then proceeds exactly as in the capacitive gauging application, substituting camera number for ring number, wheel position number for theta position, and weighted intersections for area of overlap.

FIGS. 10a and 10b show the X-Ray field sensitivity sweeps for two different sensors at the zero rotation point. FIG. 10a shows a sensitivity sweep 142 for sensor two (the numbering convention is that the first sensor is the leftmost and is numbered zero). FIG. 10b shows a sensitivity sweep 144 for sensor five.

FIGS. 11a and 11b shows the sensitivity sweep overlaps for both the input sequence and the output sequence. FIG. 11a shows the overlap area of integration for the rmm sequence with theta corresponding to forty-five degrees, i and j corresponding to two and five, respectively. FIG. 11b shows the overlap area of integration for rdm with theta corresponding to approximately 135 degrees, j equal to two and i as appropriate for the output arc section shown.

Phased Array Radar and Sonar are also class 3 applications, in which the data are sampled in range, azimuth and elevation, where the azimuth blur function is independent of angle, and is cyclic, resulting in an eigenfactorization of the azimuth dimension by a DFT.

Resolution enhancement for beamforming of cylindrically-staved systems is a class 3 application. Data are sampled as a function of time and stave element, and are output as a function of range and azimuth angle. The blur function for each stave element in the stave dimension is independent of stave element and is cyclic as we go around the stave barrel. This results in an eigenfactorization of the stave dimension by a DFT.

FIG. 12 shows the physical setup of a staved sonar. Each vertical element 150 is an array of hydrophones. Normally, this array would be located inside a sonodome at the keel of a ship. Each vertical array has its hydrophones sent to a separate beamformer. A beamformer is a special-purpose signal processor which combines the outputs of each hydrophone element of the vertical array to produce a single temporal output signal tuned to a specific listening angle in the vertical direction.

FIG. 13 shows the connections between the vertical arrays 150 and the beamformers 152. The output of the beamformers 152 is the input of the tensor processor. The two native dimensions are time and stave element number.

Standard optical microscopy enhancement and resolution enhancement for space-based imaging systems are examples in which the blur function of the system is circularly symmetric. If the data are then sampled in a polar coordinate system, the auto-covariance tensor is cyclic in the angular dimension, and is eigenfactored by a DFT or FFT operator, demonstrating instances of class 3 applications.

Other applications become possible as a result of this invention, including multidimensional radial tomography. Projections are taken in a three-dimensional polar coordinate system by revolving a sphere projector about the object to be studied. This permits full volume tomography. The tensor reconstructor factors into DFT operators in each of the θ and ψ directions, so this would be a class 3 application.

The invention can also be used for temporal resolution enhancement of motion pictures. The application of the tensor processing technique to motion pictures provides an ideal way to interpolate frames and data utilizing the full multidimensional redundancy of the data. If data are sampled on a polar grid, this would be possible as either a class 2 or class 3 application.

The invention has uses in multispectral resolution enhancement. In such an application, two-dimensional images are taken at various wavelengths. Typically, the cost of each wavelength is high, in measurement time, weight or money. By reducing the number of wavelengths used, and using the tensor processor to interpolate wavelength information, cost could be significantly reduced. Spectral resolution of existing systems could be significantly enhanced. Since the main portion of this would be the diffraction-limited blur function of the lens system, which is rotationally invariant, this would be a class 3 application.

Other embodiments are within the following claims.

What is claimed is:

1. A computed axial tomography (CAT) system for generating an enhanced resolution image of an object, said system comprising:

a ring assembly surrounding a location at which the object is placed;

an X-ray source mounted on the ring assembly;

an array of X-ray sensors arranged on the periphery of the ring assembly for measuring X-ray intensity from the object;

a drive motor for rotating the ring assembly about the object;

measurement control circuitry controlling the drive motor and receiving data from the array of X-ray sensors, said measurement control circuitry generating a plurality of vectors of X-ray data from received X-ray signals, each vector of said plurality of vectors representing X-ray intensities measured by each of the sensors of said array of X-ray sensors, each vector of said plurality of vectors representing a different angle of rotation of said ring assembly, said plurality of vectors being represented by a measured column tensor;

a memory for storing the measured column tensor; and a computer programmed to left multiply the measured column tensor stored in said memory by a reconstruction tensor T to obtain an estimate of a desired measurement column tensor, wherein said reconstruction tensor T is equal to $R_{dm}R_{mm}^{-1}$, $R_{dm}$ being a cross-covariance tensor computed for d, a desired measurement column tensor, and m, the measured column tensor, and $R_{mm}$ being an auto-covariance tensor computed for m, the measured column tensor, and wherein the estimate of a desired measurement column tensor represents an estimate of measurements that would be obtained from an hypothetical array of X-ray sensors having a higher resolution than said first mentioned array of X-ray sensors.

2. The computed axial tomography (CAT) system of claim 1 wherein the computer is programmed to compute the cross-covariance tensor in accordance with the following relationship: $R_{dm}=B_d R_{pp} B_m^t$, where $B_d$ is a desired blur tensor characterizing the hypothetical array of X-ray sensors, $B_m$ is a measurement blur tensor characterizing the first-mentioned array of X-ray sensors, t is a transpose operator, and $R_{pp}$ is a physical process auto-covariance tensor characterizing the underlying geometry of the object.

3. The computed axial tomography (CAT) system of claim 2 wherein $R_{pp}$ is equal to $\sigma_p^2 I$, where $\sigma_p^2$ is an estimate of the root-mean-square variability of the geometry of the object and I is an identity tensor.

4. The computed axial tomography (CAT) system of claim 2 wherein said computer is programmed to model the measurement blur tensor as separable in two dimensions and to thereby diagonalize $R_{mm}$ in at least one dimension to facilitate computing the inverse of $R_{mm}$.

5. The computed axial tomography (CAT) system of claim 2 wherein said computer is programmed to represent the measurement blur tensor as a factorization of a first set of orthogonal blur operators to thereby diagonalize $R_{mm}$ in at least one dimension to facilitate computing the inverse of $R_{mm}$ and wherein said computer is further programmed to represent the desired blur tensor as a factorization of a second set of orthogonal blur operators and to thereby diagonalize $R_{dm}$ to thereby facilitate computing the reconstruction tensor.

6. The computed axial tomography (CAT) system of claim 2 wherein said computer is programmed to model the measurement blur tensor as cyclic in at least one dimension and to thereby diagonalize $R_{mm}$ in at least one dimension to facilitate computing the inverse of $R_{mm}$.

7. The computed axial tomography (CAT) system of claim 2 wherein said computer is programmed to represent the measurement blur tensor as cyclic in at least one dimension to thereby diagonalize $R_{mm}$ in at least one dimension to facilitate computing the inverse of $R_{mm}$ and wherein said computer is further programmed to represent the desired blur tensor as cyclic in at least one dimension and to thereby diagonalize $R_{dm}$ to thereby facilitate computing the reconstruction tensor.

8. The computed axial tomography (CAT) system of claim 1 wherein the computer is programmed to compute the auto-covariance tensor in accordance with the following relationship: $R_{mm}=B_m R_{pp} B_m^t + \sigma_n^2 I$, where $B_m$ is a measurement blur tensor characterizing the first-mentioned array of X-ray sensors, $R_{pp}$ is an auto-covariance tensor characterizing the underlying geometry of the object, $\sigma_n^2$ is a noise variance characterizing noise in the measurement system, t is a transpose operator, and I is an identity tensor.

9. The computed axial tomography (CAT) system of claim 1 wherein the reconstruction tensor T is precomputed and stored in said memory.

10. The computed axial tomography (CAT) system of claim 1 wherein the computer is programmed to:

compute the cross-covariance tensor in accordance with the following relationship: $R_{dm}=B_d R_{pp} B_m^t$, where $B_d$ is a desired blur tensor characterizing the hypothetical array of X-ray sensors, $B_m$ is a measurement blur tensor characterizing the first-mentioned array of X-ray sensors, t is a transpose operator, and $R_{pp}$ is an physical process auto-covariance tensor characterizing the underlying geometry of the object; and compute the auto-covariance tensor in accordance with the following relationship: $R_{mm}=B_m R_{pp} B_m^t + \sigma_n^2 I$, where $R_{pp}$ is an auto-covariance tensor characterizing the underlying geometry of the object, $\sigma_n^2$ is a noise variance characterizing noise in the measurement system, and I is an identity tensor.

11. An ultrasound imaging system for generating an enhanced resolution ultrasound image of internal structure of an object, said ultrasonic imaging system comprising:

a housing;

a transducer inside of the housing for sending and receiving acoustic signals;

a motor drive positioning the transducer to selected angles within a range of possible angles;

measurement control circuitry controlling the motor drive, sending ultrasonic pulses through the transducer and receiving echoes from the object, said measurement control circuitry generating a plurality of vectors of ultrasonic data, each vector of said plurality of vectors representing a plurality of signal samples for a given angle of said transducer, each vector of said plurality of vectors representing a different angle of said transducer, said plurality of vectors being represented by a measured column tensor;

a memory for storing the measured column tensor; and a computer programmed to left multiply the measured column tensor stored in said memory by a reconstruction tensor T to obtain an estimate of a desired measurement column tensor, wherein said reconstruction tensor T is equal to $R_{dm}R_{mm}^{-1}$, being a cross-covariance tensor computed for d, a desired measurement column tensor, and m, the measured column tensor, and $R_{mm}$ being an auto-covariance tensor computed for m, the measured column tensor, and wherein the estimate of a desired measurement column tensor represents an estimate of measurements that would be obtained from an hypothetical transducer having a higher resolution than said first mentioned transducer.

12. The ultrasound imaging system of claim 11 wherein the computer is programmed to compute the cross-covariance tensor in accordance with the following relationship: $R_{dm}=B_d R_{pp} B_m'$, where $B_d$ is a desired blur tensor characterizing the hypothetical transducer, $B_m$ is a measurement blur tensor characterizing the first-mentioned transducer, t is a transpose operator, and $R_{pp}$ is a physical process auto-covariance tensor characterizing the underlying geometry of the object.

13. The ultrasound imaging system of claim 12 wherein $R_{pp}$ is equal to $\sigma_p^2 I$, where $\sigma_p^2$ is an estimate of the root-mean-square variability of the geometry of the object and I is an identity tensor.

14. The ultrasound imaging system of claim 12 wherein said computer is programmed to model the measurement blur tensor as separable in two dimensions and to thereby diagonalize $R_{mm}$ in at least one dimension to facilitate computing the inverse of $R_{mm}$.

15. The ultrasound imaging system of claim 12 wherein said computer is programmed to represent the measurement blur tensor as a factorization of a first set of orthogonal blur operators to thereby diagonalize $R_{mm}$ in at least one dimension to facilitate computing the inverse of $R_{mm}$ and wherein said computer is further programmed to represent the desired blur tensor as a factorization of a second set of orthogonal blur operators and to thereby diagonalize $R_{dm}$ to thereby facilitate computing the reconstruction tensor.

16. The ultrasound imaging system of claim 12 wherein said computer is programmed to model the measurement blur tensor as cyclic in at least one dimension and to thereby diagonalize $R_{mm}$ in at least one dimension to facilitate computing the inverse of $R_{mm}$.

17. The ultrasound imaging system of claim 12 wherein said computer is programmed to represent the measurement blur tensor as cyclic in at least one dimension to thereby diagonalize $R_{mm}$ in at least one dimension to facilitate computing the inverse of $R_{mm}$ and wherein said computer is further programmed to represent the desired blur tensor as cyclic in at least one dimension and to thereby diagonalize $R_{dm}$ to thereby facilitate computing the reconstruction tensor.

18. The ultrasound imaging system of claim 11 wherein the computer is programmed to compute the auto-covariance tensor in accordance with the following relationship: $R_{mm}=B_m R_{pp} B_m'+\sigma_n^2 I$, where $B_m$ is a measurement blur tensor characterizing the first-mentioned transducer, $R_{pp}$ is an auto-covariance tensor characterizing the underlying geometry of the object, $\sigma_n^2$ is a noise variance characterizing noise in the measurement system, t is a transpose operator, and I is an identity tensor.

19. The ultrasound imaging system of claim 11 wherein the reconstruction tensor T is precomputed and stored in said memory.

20. The ultrasound imaging system of claim 11 wherein the computer is programmed to:

compute the cross-covariance tensor in accordance with the following relationship: $R_{dm}=B_d R_{pp} B_m'$, where $B_d$ is a desired blur tensor characterizing the hypothetical transducer, $B_m$ is a measurement blur tensor characterizing the first-mentioned transducer, t is a transpose operator, and $R_{pp}$ is an physical process auto-covariance tensor characterizing the underlying geometry of the object; and compute the auto-covariance tensor in accordance with the following relationship: $R_{mm}=B_m R_{pp} B_m'+\sigma_n^2 I$, where $R_{pp}$ is an auto-covariance tensor characterizing the underlying geometry of the object, $\sigma_n^2$ is a noise variance characterizing noise in the measurement system, and I is an identity tensor.

21. A computer-implemented method for generating an enhanced resolution image of an object, the method comprising the steps of:

through the use of a sensor assembly of one or more sensors, generating an image of the object, said image comprising an array of sensor generated measurements;

by computer-implemented steps, representing said array of sensor generated measurements as a measured column tensor;

by computed-implemented steps, left multiplying the measured column tensor by a reconstruction tensor T to obtain an estimate of a desired measurement column tensor, wherein said reconstruction tensor T is equal to $R_{dm}R_{mm}^{-1}$, $R_{dm}$ being a cross-covariance tensor computed for d, a desired measurement column tensor, and m, the measured column tensor, and $R_{mm}$ being an auto-covariance tensor computed for m, the measured column tensor, and wherein the estimate of a desired measurement column tensor represents an estimate of sensor generated measurements that would be obtained from a hypothetical sensor assembly having a higher resolution than said first mentioned sensor assembly.

22. The computer-implemented method of claim 21 wherein the image generating step comprises using a thickness measurement probe to measure the thickness of a substrate over a two-dimensional area of the substrate, said thickness measurement probe having a predetermined resolution, and wherein the image generating step further comprises sampling the measured thickness of the substrate with said thickness measurement probe over the two-dimensional area of the substrate in a two-dimensional pattern to generate said image, said image comprising a two-dimensional array of measurements, each measurement of said two-dimensional array of measurements representing a substrate thickness measurement by said thickness measurement probe of a different region of said two-dimensional area, said two-dimensional array of measurements being represented by the measured column tensor, and wherein the estimate of a desired measurement column tensor represents an estimate of substrate thickness measurements that would be obtained from an hypothetical thickness measurement probe having a different resolution from said first mentioned thickness measurement probe.

23. The computer-implemented method of claim 21 wherein the image generating step comprises using an array of X-ray sensors in a computed axial tomography (CAT) system, receiving data from the array of X-ray sensors, and generating a plurality of vectors of X-ray data from received X-ray signals, each vector of said plurality of vectors representing X-ray intensities measured by each of the sensors of said array of X-ray sensors, each vector of said plurality of vectors representing a different angle of rotation, said plurality of vectors being represented by said measured column tensor, and wherein the estimate of a desired measurement column tensor represents an estimate of measurements that would be obtained from an hypothetical array of X-ray sensors having a higher resolution than said first mentioned array of X-ray sensors.

24. The computer-implemented method of claim 21 wherein the image generating step comprises using a transducer inside of an ultrasound imaging system to generate an enhanced resolution ultrasound image of internal structure of the object, receiving echoes from the object, and generating a plurality of vectors of ultrasonic data, each vector of said plurality of vectors representing a plurality of signal samples for a given angle of said transducer, each vector of said plurality of vectors representing a different angle of said transducer, said plurality of vectors being represented by said measured column tensor, and wherein the estimate of a desired measurement column tensor represents an estimate of measurements that would be obtained from an hypothetical transducer having a higher resolution than said first mentioned transducer.

25. A system capable of generating an enhanced resolution image of an object, said system comprising:

a sensor assembly mounted relative to said object for examining said object, said sensor assembly comprising one or more sensors;

measurement circuitry generating an image of a region of the object that is examined by the sensor assembly, said image comprising an array of measurements, each measurement of said array of measurements representing a measurement by said sensor assembly of a different portion of said region, said array of measurements being represented by a measured column tensor;

a memory for storing the measured column tensor; and a computer programmed to left multiply the measured column tensor stored in said memory by a reconstruction tensor T to obtain an estimate of a desired measurement column tensor, wherein said reconstruction tensor T is equal to $R_{dm}R_{mm}^{-1}$, $R_{dm}$ being a cross-covariance tensor computed for d, a desired measurement column tensor, and m, the measured column tensor, and $R_{mm}$ being an auto-covariance tensor computed for m, the measured column tensor, and wherein the estimate of a desired measurement column tensor represents an estimate of measurements that would be obtained from an hypothetical sensor assembly having a higher resolution than said first mentioned sensor assembly.

* * * * *